US011950258B2

(12) United States Patent
Yang et al.

(10) Patent No.: US 11,950,258 B2
(45) Date of Patent: Apr. 2, 2024

(54) HARQ FEEDBACK REPORTING FOR CROSS-CARRIER SCHEDULING

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/937,551

(22) Filed: Oct. 3, 2022

(65) Prior Publication Data

US 2023/0025106 A1    Jan. 26, 2023

Related U.S. Application Data

(62) Division of application No. 16/949,094, filed on Oct. 13, 2020, now Pat. No. 11,464,036.

(Continued)

(51) Int. Cl.
*H04L 1/1812*    (2023.01)
*H04L 1/1829*    (2023.01)
(Continued)

(52) U.S. Cl.
CPC ......... *H04W 72/232* (2023.01); *H04L 1/1819* (2013.01); *H04L 1/1854* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

| 10,512,075 B2 | 12/2019 | John Wilson et al. |
| 11,464,036 B2 | 10/2022 | Yang et al. |

(Continued)

FOREIGN PATENT DOCUMENTS

| EP | 3780717 A1 | 2/2021 |
| WO | 2018144168 A1 | 8/2018 |

(Continued)

OTHER PUBLICATIONS

China Telecom: "Discussion on Multi-TRP/Panel Transmission Enhancements", 3GPP TSG RAN WG1 #98bis, 3GPP Draft; R1-1911235, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14,2019-Oct. 20,2019, Oct. 4, 2019 (Oct. 4, 2019), 9 Pages.

(Continued)

*Primary Examiner* — Timothy J Weidner
(74) *Attorney, Agent, or Firm* — Harrity & Harrity LLP/Qualcomm Incorporated

(57) ABSTRACT

Various aspects of the present disclosure generally relate to wireless communication. In some aspects, a base station may transmit a plurality of physical downlink control channel (PDCCH) communications in a same PDCCH monitoring occasion in a first cell, and may transmit a plurality of physical downlink shared channel (PDSCH) communications in at least one of the first cell or a second cell. Each of the PDCCH communications schedules a respective PDSCH communication of the plurality of PDSCH communications. A PDCCH communication, of the plurality of PDCCH communications, includes an indication of a counter downlink assignment index that is based at least in part on a combination of a starting symbol and a cell in which an associated PDSCH communication is to be transmitted, a cell index of the cell in which the associated PDSCH (Continued)

communication is to be transmitted, and the PDCCH monitoring occasion. Numerous other aspects are provided.

30 Claims, 15 Drawing Sheets

Related U.S. Application Data

(60) Provisional application No. 63/035,631, filed on Jun. 5, 2020, provisional application No. 62/915,444, filed on Oct. 15, 2019.

(51) Int. Cl.

| | |
|---|---|
| *H04L 1/1867* | (2023.01) |
| *H04L 5/00* | (2006.01) |
| *H04W 24/08* | (2009.01) |
| *H04W 24/10* | (2009.01) |
| *H04W 28/02* | (2009.01) |
| *H04W 28/04* | (2009.01) |
| *H04W 72/0446* | (2023.01) |
| *H04W 72/0453* | (2023.01) |
| *H04W 72/1268* | (2023.01) |
| *H04W 72/1273* | (2023.01) |
| *H04W 72/21* | (2023.01) |
| *H04W 72/23* | (2023.01) |
| *H04W 72/232* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04L 1/1861* (2013.01); *H04L 1/1887* (2013.01); *H04L 1/1893* (2013.01); *H04L 5/0046* (2013.01); *H04L 5/0055* (2013.01); *H04L 5/0076* (2013.01); *H04L 5/0083* (2013.01); *H04L 5/0094* (2013.01); *H04W 24/08* (2013.01); *H04W 24/10* (2013.01); *H04W 28/0273* (2013.01); *H04W 28/04* (2013.01); *H04W 72/0446* (2013.01); *H04W 72/0453* (2013.01); *H04W 72/1268* (2013.01); *H04W 72/1273* (2013.01); *H04W 72/21* (2023.01); *H04W 72/23* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .... H04J 2011/0003–0096; H04L 1/0001–248; H04L 5/0001–0098; H04W 8/22–245; H04W 24/02–10; H04W 28/02–26; H04W 36/0005–385; H04W 48/02–20; H04W 72/02–569; H04W 74/002–008; H04W 76/10–50; H04W 84/02–16; H04W 88/02–12; H04W 92/02; H04W 92/04; H04W 92/10
See application file for complete search history.

(56) References Cited

U.S. PATENT DOCUMENTS

| | | | |
|---|---|---|---|
| 2018/0019843 | A1 | 1/2018 | Papasakellariou |
| 2019/0103943 | A1* | 4/2019 | Wang .................. H04W 72/23 |
| 2019/0223085 | A1 | 7/2019 | Wang et al. |
| 2021/0153204 | A1* | 5/2021 | Takeda ................ H04W 72/23 |
| 2021/0204286 | A1 | 7/2021 | Yang et al. |
| 2021/0344455 | A1 | 11/2021 | Choi et al. |
| 2023/0027630 | A1 | 1/2023 | Yang et al. |

FOREIGN PATENT DOCUMENTS

| | | |
|---|---|---|
| WO | 2019139438 A1 | 7/2019 |
| WO | 2019160387 A1 | 8/2019 |
| WO | 2019174486 A1 | 9/2019 |
| WO | 2019193700 A1 | 10/2019 |

OTHER PUBLICATIONS

Huawei, et al., "Summary of Enhancements on Multi-TRP/Panel Transmission", 3GPP Draft, 3GPP TSG RAN WG1 Meeting #98, R1-1909602 FLSUMMARY_MTRP_V3, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26. 2019-Aug. 30, 2019, Sep. 3, 2019 (Sep. 3, 2019), Aug. 30, 2019 (Aug. 30, 2019), XP051766198, 76 Pages.
International Search Report and Written Opinion—PCT/US2020/070669—ISA/EPO—Apr. 12, 2021.
Nokia, et al., "Remaining Aspects of NR CA", 3GPP Draft, 3GPP TSG RAN WG1 Meeting #92, R1-1802540_CA, 3rd Generation Partnership Project (3GPP). Mobile Competence Centre, 650, Route Des Lucioles, F-06921 Sophia- Antipolis Cedex, France, vol. RAN WG1, No. Athens, Greece, Feb. 26, 2018-Mar. 2, 2018, 8 Pages, Feb. 16, 2018 (Feb. 16, 2018).
NTT DOCOMO, et al., "Remaining Issues on HARQ-ACK Codebook and CA", 3GPP TSG RAN WG1 Meeting #92bis, 3GPP Draft; R1-1805059, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, 8 Pages, Apr. 15, 2018 (Apr. 15, 2018).
NTT DOCOMO Inc: "Enhancements on Multi-TRP/Panel Transmission", 3GPP Draft, 3GPP TSG RAN WG1 #98bis, R1-1911184, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019) 32 Pages.
Partial International Search Report—PCT/US2020/070669—ISA/EPO—Jan. 27, 2021.
ZTE: "Enhancements on Multi-TRP and Multi-panel Transmission", 3GPP Draft, 3GPP Tsg Ran WG1 #98bis, R1-1910284 Enhancements on Multi-TRP and Multi-Panel Transmission, 3rd Generation Partnership Project (3GPP), Mobile Competence Centre, 650, Route Des Lucioles, F-06921 Sophia-Antipolis, vol. RAN WG1, No. Chongqing, China, Oct. 14, 2019-Oct. 20, 2019, 20 Pages, Oct. 5, 2019 (Oct. 5, 2019).
European Search Report—EP23154599—Search Authority—The Hague—Apr. 13, 2023.
NTT DOCOMO, Inc: "Physical Layer Enhancements for DL SPS", 3GPP TSG RAN WG1 #97, R1-1906219, 3rd Generation Partnership Project, Mobile Competence Centre, 650, Route Des Lucioles, F-06921 Sophia-Antipolis Cedex, France, vol. RAN WG1. No. Reno, USA, May 13, 2019-May 17, 2019, May 13, 2019, XP051727673, 7 Pages, the whole document, Section 2, Section 4 figures 1. 2, Paragraph [0004].

* cited by examiner

HARQ FEEDBACK REPORTING FOR CROSS-CARRIER SCHEDULING

CROSS-REFERENCE TO RELATED APPLICATIONS

This application is a divisional of U.S. patent application Ser. No. 16/949,094, filed Oct. 13, 2020 (now U.S. Pat. No. 11,464,036), entitled "HARQ FEEDBACK REPORTING FOR CROSS-CARRIER SCHEDULING," which claims priority to U.S. Provisional Patent Application No. 62/915,444, filed on Oct. 15, 2019, entitled "HARQ FEEDBACK REPORTING FOR CROSS-CARRIER SCHEDULING," and to U.S. Provisional Patent Application No. 63/035,631, filed on Jun. 5, 2020, entitled "HARQ FEEDBACK REPORTING FOR CROSS-CARRIER SCHEDULING," which are assigned to the assignee hereof. The disclosures of the prior Applications are considered part of and are incorporated herein by reference in their entireties.

FIELD OF THE DISCLOSURE

Aspects of the present disclosure generally relate to wireless communication and to techniques and apparatuses for hybrid automatic repeat request feedback reporting for cross-carrier scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a base station (BS), may include transmitting a plurality of physical downlink control channel (PDCCH) communications in a same PDCCH monitoring occasion in a first cell; and transmitting a plurality of physical downlink shared channel (PDSCH) communications in at least one of the first cell or a second cell, wherein each of plurality of the PDCCH communications schedules a respective PDSCH communication of the plurality of PDSCH communications, and wherein a PDCCH communication, of the plurality of PDCCH communications, includes an indication of a counter downlink assignment index (DAI) that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, a method of wireless communication, performed by a user equipment (UE), may include receiving a plurality of PDCCH communications in a same PDCCH monitoring occasion in a first cell; and receiving a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, a BS for wireless communication may include memory and one or more processors operatively coupled to the memory. The memory and the one or more processors may be configured to transmit a plurality of PDCCH communications in a same PDCCH monitoring occasion in a first cell; and transmit a plurality of physical downlink shared channel PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, a UE for wireless communication may include memory and one or more processors operatively coupled to the memory. The memory and the one or more processors may be configured to receive a plurality of PDCCH communications in a same PDCCH monitoring occasion in a first cell; and receive a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, a non-transitory computer-readable medium may store one or more instructions for wireless communication. The one or more instructions, when executed by one or more processors of a BS, may cause the one or more processors to transmit a plurality of PDCCH communications in a same PDCCH monitoring occasion in a first cell; and transmit a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, a non-transitory computer-readable medium may store one or more instructions for wireless communication. The one or more instructions, when executed by one or more processors of a UE, may cause the one or more processors to: receive a plurality of PDCCH communications in a same PDCCH monitoring occasion in a first cell; and receive a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, an apparatus for wireless communication may include means for transmitting a plurality of PDCCH communications in a same PDCCH monitoring occasion in a first cell; and means for transmitting a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, an apparatus for wireless communication may include means for receiving a plurality of PDCCH communications in a same PDCCH monitoring occasion in a first cell; and means for receiving a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

In some aspects, a method of wireless communication performed by a user UE includes receiving, in a same PDCCH monitoring occasion, a first PDCCH communication that schedules a downlink SPS release, and one or more second PDCCH communications that each schedule respective PDSCH communications; and transmitting HARQ feedback for the downlink SPS release and HARQ feedback for the respective PDSCH communications in the same slot.

In some aspects, a method of wireless communication performed by a UE includes receiving, in a same PDCCH monitoring occasion, a first PDCCH communication that schedules a downlink SPS release, and one or more second PDCCH communications that each schedule respective PDSCH communications; determining that an error has occurred based at least in part on at least one of the UE being scheduled to transmit HARQ feedback for the downlink SPS release and HARQ feedback for the respective PDSCH communications in the same slot or the first PDCCH communication and the one or more second PDCCH communications being received in the same PDCCH monitoring occasion.

In some aspects, a non-transitory computer-readable medium storing a set of instructions for wireless communication includes one or more instructions that, when executed by one or more processors of a UE, cause the UE to receive, in a same PDCCH monitoring occasion: a first PDCCH communication that schedules a downlink SPS release, and one or more second PDCCH communications that each schedule respective PDSCH communications; and transmit HARQ feedback for the downlink SPS release and HARQ feedback for the respective PDSCH communications in the same slot.

In some aspects, a non-transitory computer-readable medium storing a set of instructions for wireless communication includes one or more instructions that, when executed by one or more processors of a UE, cause the UE to receive, in a same PDCCH monitoring occasion: a first PDCCH communication that schedules a downlink SPS release, and one or more second PDCCH communications that each schedule respective PDSCH communications; determine that an error has occurred based at least in part on at least one of the UE being scheduled to transmit HARQ feedback for the downlink SPS release and HARQ feedback for the respective PDSCH communications in the same slot or the first PDCCH communication and the one or more second PDCCH communications being received in the same PDCCH monitoring occasion.

In some aspects, a UE for wireless communication includes a memory; and one or more processors operatively coupled to the memory, the memory and the one or more processors configured to: receive, in a same PDCCH monitoring occasion: a first PDCCH communication that schedules a downlink SPS release, and one or more second PDCCH communications that each schedule respective PDSCH communications; and transmit HARQ feedback for the downlink SPS release and HARQ feedback for the respective PDSCH communications in the same slot.

In some aspects, a UE for wireless communication includes a memory; and one or more processors operatively coupled to the memory, the memory and the one or more processors configured to receive, in a same PDCCH monitoring occasion, a first PDCCH communication that schedules a downlink SPS release, and one or more second PDCCH communications that each schedule respective PDSCH communications; determine that an error has occurred based at least in part on at least one of the UE being scheduled to transmit HARQ feedback for the downlink SPS release and HARQ feedback for the respective PDSCH communications in the same slot or the first PDCCH communication and the one or more second PDCCH communications being received in the same PDCCH monitoring occasion.

In some aspects, an apparatus for wireless communication includes means for receiving, in a same PDCCH monitoring occasion: a first PDCCH communication that schedules a downlink SPS release, and one or more second PDCCH communications that each schedule respective PDSCH communications; and means for transmitting HARQ feedback for the downlink SPS release and HARQ feedback for the respective PDSCH communications in the same slot.

In some aspects, an apparatus for wireless communication includes means for receiving, in a same PDCCH monitoring occasion a first PDCCH communication that schedules a downlink SPS release, and one or more second PDCCH communications that each schedule respective PDSCH communications; means for determining that an error has occurred based at least in part on at least one of the apparatus being scheduled to transmit HARQ feedback for the downlink SPS release and HARQ feedback for the respective PDSCH communications in the same slot or the first PDCCH communication and the one or more second PDCCH communications being received in the same PDCCH monitoring occasion.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
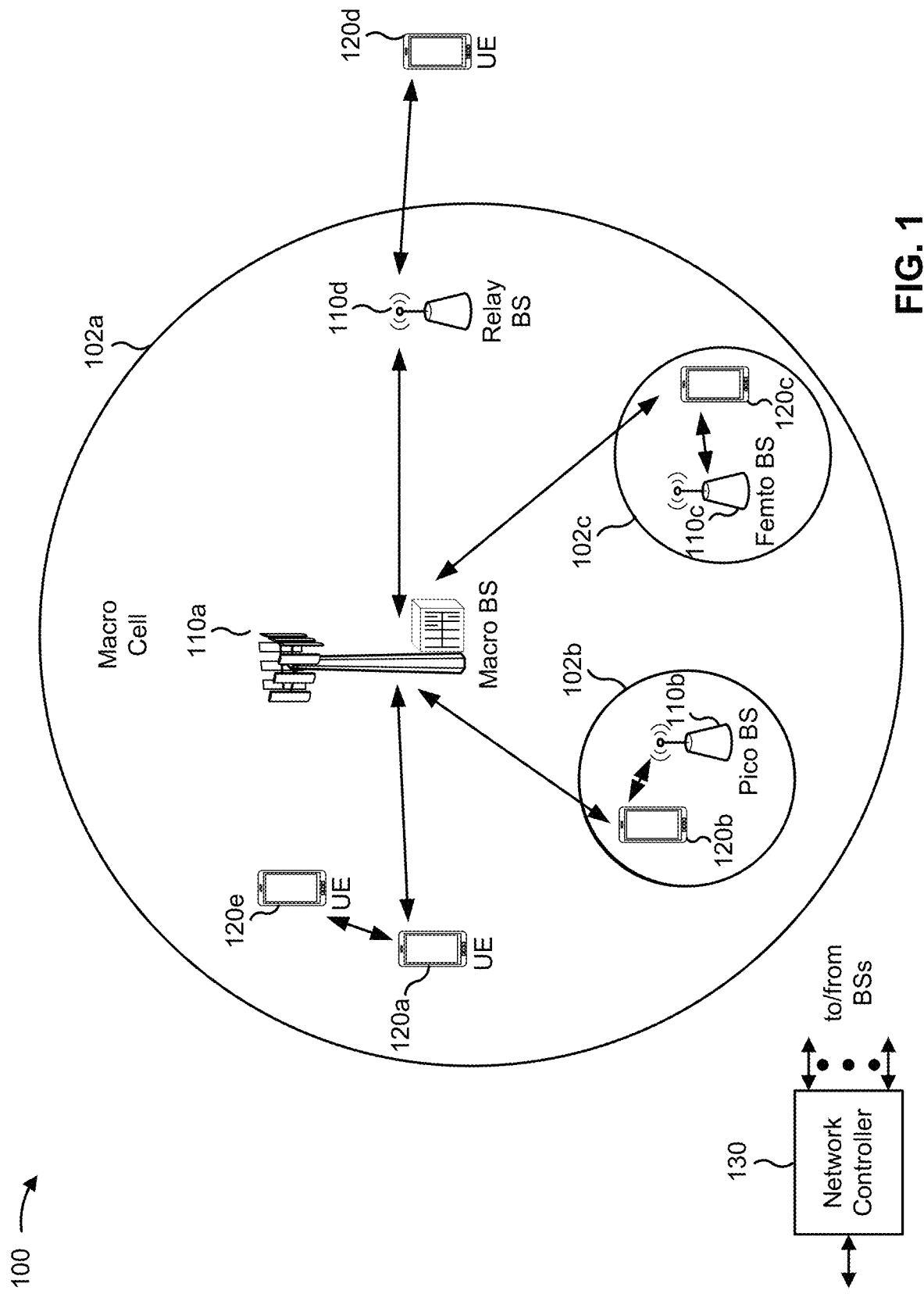
FIG. 1 is a block diagram illustrating an example of a wireless communication network, in accordance with various aspects of the present disclosure.

A user equipment (UE) may generate and transmit hybrid automatic repeat request (HARQ) feedback associated with one or more physical downlink control channel (PDCCH) communications and/or one or more physical downlink shared channel (PDSCH) communications transmitted from a base station (BS). HARQ feedback may include an acknowledgement (ACK) or a negative ACK (NACK). An ACK may indicate that an associated communication was successfully received and decoded, whereas a NACK may indicate that an associated communication was not successfully received or decoded.

In some cases, a UE may transmit a physical uplink control channel (PUCCH) communication to a BS, where the PUCCH communication carries HARQ feedback associated with a plurality of PDCCH communications and/or PDSCH communications. The UE may generate and/or construct the PUCCH communication based at least in part on a HARQ codebook. For example, the UE may generate and/or construct the PUCCH communication based at least in part on a semi-static HARQ codebook (e.g., Type 1 codebook) or a dynamic HARQ codebook (e.g., Type 2 codebook).

A UE may generate and/or construct a dynamic HARQ codebook based at least in part on a bit ordering and a codebook size, both of which may be indicated to the UE by a BS transmitting the PDCCH/PDSCH communications for which HARQ feedback is to be transmitted. The bit ordering and codebook size may be indicated in one or more PDCCH communications transmitted from the BS, and may be indicated by a counter downlink assignment index (DAI) and a total DAI. In some aspects, the counter DAI may be included in downlink control information (DCI) in each of the PDCCH communications. In some aspects, the total DAI may be included in the DCI of one or more of the PDCCH communications depending on a format of the DCI (e.g., total DAI may be included in DCI format 1_1 and/or may not be included in DCI format 1_0).

A counter DAI may indicate an accumulative quantity of {serving cell, PDCCH monitoring occasion} pairs in which PDSCH reception associated with PDCCH communications that have been transmitted by the BS up to the current PDCCH monitoring occasion (e.g., a time-frequency resource in which the UE is to monitor for PDCCH communications from the BS) for a particular serving cell. A total DAI may indicate a total quantity of {serving cell, PDCCH monitoring occasion} pairs in which PDSCH reception associated with PDCCH communications that have been transmitted by the BS up to the current PDCCH monitoring occasion across all serving cells associated with the BS. The counter DAI and the total DAI are updated by the BS in each PDCCH monitoring occasion in a HARQ monitoring period (e.g., a set of time-frequency domain resources across which the UE is to accumulate HARQ feedback), in which a PDCCH communication is transmitted, until the slot in which the UE is to transmit the PUCCH communication carrying the HARQ feedback. The UE may transmit the PUCCH communication in a PUCCH resource identified by a PUCCH resource indicator (PM) included in the last PDCCH communication transmitted in the HARQ monitoring period.

In some cases, a UE may communicate with a BS across a plurality of serving cells, such as serving cell 1, serving cell 2, and/or the like. In this case, the BS may increment the counter DAI in a particular order. For example, the BS may increment the counter DAI in the order of serving cell first and PDCCH monitoring occasion second. The BS may increment the total DAI on a per monitoring occasion basis, in which the total DAI is incremented across each PDCCH monitoring occasion in a slot for all serving cells in a particular PDCCH monitoring occasion.

As an example of the above, a slot may include two PDCCH monitoring occasions in which the BS transmits a PDCCH communication in serving cell 1 (e.g., PDCCH monitoring occasion 1 and PDCCH monitoring occasion 2, each including a PDCCH communication that schedules a respective PDSCH communication). The slot may further include one PDCCH monitoring occasion in which the BS transmits a PDCCH communication in serving cell 2 (e.g., that schedules an associated PDSCH communication). PDCCH monitoring occasion 1 and the PDCCH monitoring occasion in serving cell 2 may occur in the same PDCCH monitoring occasion. In this example, the BS may increment the counter DAI and the total DAI respectively as (1,2) for PDCCH monitoring occasion 1, (2,2) in the PDCCH monitoring occasion in serving cell 2, and (3,3) in PDCCH monitoring occasion 2.

In some cases, a BS may transmit a single PDCCH communication in a PDCCH monitoring occasion in a serving cell, where the PDCCH communication schedules a PDSCH communication in a particular slot in the serving cell. However, if a UE communicates with a BS across a plurality of serving cells, and the serving cells are configured with mixed numerology (e.g., different subcarrier spacings), the BS may be permitted to transmit a plurality of PDCCH communications in the same PDCCH monitoring occasion, where the plurality of PDCCH communications schedule a plurality of PDSCH communications across a plurality of slots in a serving cell. For example, the BS may perform cross-carrier scheduling, where the BS may transmit a plurality of PDCCH communications in the same slot on a cell 1 (e.g., a scheduling cell configured with a 30 KHz subcarrier spacing), and may transmit a plurality of PDSCH communications in cell 2 (e.g., a PDSCH serving cell which may be configured with a 120 KHz subcarrier spacing) scheduled by the plurality of PDCCH communications. In this case, the plurality of PDSCH communications may be transmitted across a plurality of slots in cell 2, and the BS may be unable to update the counter DAI for each of the plurality of PDSCH communications.

Some aspects described herein provide techniques and apparatuses for HARQ feedback reporting for cross-carrier scheduling. In some aspects, a BS may increment a counter DAI for a plurality of PDCCH communications transmitted in a same PDCCH monitoring occasion in a scheduling cell that schedules PDSCH communications in a PDSCH serving cell and/or the scheduling cell. The BS may increment the counter DAI in an order that includes 1) a combination of the starting symbols for all PDSCH communications associated with the same PDCCH monitoring occasion and the cell in which the PDSCH communications are transmitted (e.g., in ascending order), 2) the cell index associated with the cell in which PDSCH communications associated with the same PDCCH monitoring occasion are transmitted (e.g., in ascending order), and 3) the PDCCH monitoring occasion (e.g., in ascending order).

As an example of the above, the BS may transmit a plurality of PDCCH communications (e.g., PDCCH communication 1, PDCCH communication 2, and PDCCH communication 3) in the same PDCCH monitoring occasion, where each of the PDCCH communications schedules a respective PDSCH communication (e.g., PDSCH communication 1, PDSCH communication 2, and PDSCH communication 3). The BS may schedule PDSCH communication 2 to be transmitted in cell 1, and may schedule PDSCH communication 1 and PDSCH communication 3 to be transmitted in cell 2. Moreover, the BS may schedule PDSCH communication 2 and PDSCH communication 3 with the same starting symbol, and may schedule PDSCH communication 1 with a starting symbol that occurs prior to the starting symbol of PDSCH communication 2 and PDSCH communication 3.

In this example, the BS may configure PDCCH communication 2 to include a counter DAI and total DAI pair of (1,3) because PDSCH communication 2 is scheduled to be transmitted in cell 1. In this case, the counter DAI of PDCCH communication 2 is 1 because cell 1 is the lowest cell index associated with the PDCCH monitoring occasion, and the total DAI is 3 because three PDSCH communications are associated with the PDCCH monitoring occasion.

The BS may configure PDCCH communication 1 to include a counter DAI and total DAI pair of (2,3). In this case, the counter DAI of PDCCH communication 1 may be 2 because PDSCH communication 1 is scheduled to be transmitted in cell 2 (which is a cell index greater than cell 1), and because PDSCH communication 1 is scheduled to be transmitted in a starting symbol that occurs prior to the starting symbol of PDSCH communication 3 in the same cell. The BS may configure PDCCH communication 3 to include a counter DAI and total DAI pair of (3,3). In this case, the counter DAI of PDCCH communication 3 may be 3 because PDSCH communication 3 is scheduled to be transmitted in cell 2 (which is a cell index greater than cell 1), and because PDSCH communication 3 is scheduled to be transmitted in a starting symbol that occurs after to the starting symbol of PDSCH communication 1 in the same cell.

Accordingly, the UE may generate and/or construct a dynamic HARQ codebook for transmitting HARQ feedback, associated with the plurality of PDCCH communications and the plurality of PDSCH communications, based at least in part on the counter DAIS and total DAIS indicated in the plurality of PDCCH communications. For example, the HARQ feedback for each of the PDCCH communication and PDSCH communication combinations may be ordered in the dynamic HARQ codebook according to the counter DAI and total DAI pair indicated in each of the PDCCH communications. Continuing with the example above, the UE may generate and/or construct a dynamic HARQ codebook in which an order of HARQ feedback is (1,3), (2,3), and (3,3). In other words, the HARQ feedback (e.g., ACK/ NACK) for PDCCH communication 2/PDSCH communication 2 may be ordered first in the dynamic HARQ codebook, the HARQ feedback for PDCCH communication 1/PDSCH communication 1 may be ordered second in the dynamic HARQ codebook, and the HARQ feedback for PDCCH communication 3/PDSCH communication 3 may be ordered third in the dynamic HARQ codebook.

The UE may transmit the HARQ feedback (e.g., in the order that is based at least in part on the dynamic HARQ codebook) in a PUCCH communication. The UE may transmit the PUCCH communication in a PM identified by the last PUCCH/DCI communication transmitted in an a HARQ monitoring period associated with the PUCCH communication. The PM determination may be based at least in part on a PRI field included in a last DCI format 1_0 or DCI format 1_1, among the DCI formats 1_0 or DCI formats 1_1 that have a value of a PDSCH-to-HARQ feedback timing indicator field (e.g., a K1 field) indicating a same slot for the PUCCH transmission that the UE detects and for which the UE transmits corresponding HARQ feedback in the PUCCH communication. For the PUCCH resource determination, in some aspects, the detected DCI formats may be first indexed in an ascending order across serving cells indexes for a same PDCCH monitoring occasion and may then indexed in an ascending order across PDCCH monitoring occasion indexes. In some aspects, the DCI formats may be indexed in a manner similar to the counter DAI.

In some aspects, such as in 5G/New Radio (NR), the counter DAI may be represented by two bits, which can be used to indicate an ordering of 1 (00), 2 (01), 3 (10), and 4 (11). If the quantity of PDSCH communications exceeds 4, the counter DAI may restart from 00 again. The UE may determine whether a received counter DAI=00 corresponds to a decimal value of 1 or 5 or 9 by comparing adjacent counter DAI values.

In this way, the BS may determine and configure a counter DAI and a total DAI to permit dynamic HARQ codebook generation/construction for cross-carrier scheduling. Moreover, in this way, if the UE misses or fails to receive a PDCCH communication that schedules a PDSCH communication, the UE is permitted to use counter DAIs and total DAIs indicated in other PDCCH communications to determine the counter DAI and the total DAI for the unreceived PDCCH communication, which permits the UE to provide HARQ feedback (e.g., a NACK) for the unreceived PDCCH communication.

The proposed ordering (e.g., using PDSCH symbols) may provide increased counter DAI tracking where the quantity of PDSCH communications exceeds 4, such as where the scheduling cell is 15 KHz subcarrier spacing and the PDSCH serving cell is 120 K Hz subcarrier spacing. In this case, 1 PDCCH slot is equal to 8 PDSCH slot, which means that the BS may schedule up to 8 PDSCH transmissions in a single PDCCH monitoring occasion. In this case, the UE may receive two PDCCH/DCI communications with the same counter DAI field (e.g., 00), and UE may use the proposed order to determine that the counter DAI associated with an earlier PDSCH communication is smaller in decimal value than the counter DAI associated with a later PDSCH communication on the same serving cell corresponding to the same PDCCH monitoring occasion.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
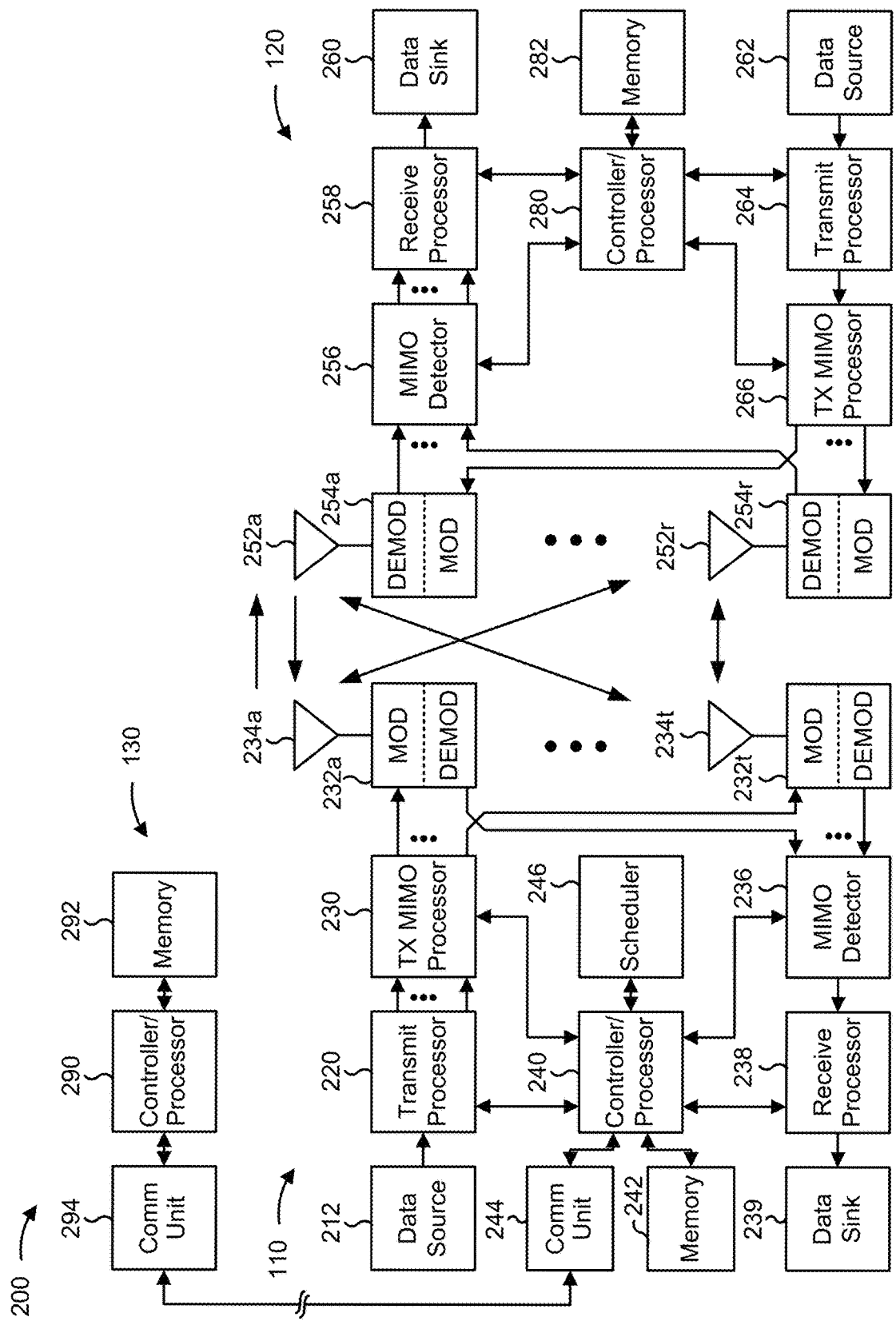
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with HARQ feedback reporting for cross-carrier scheduling, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

Figure 7A:
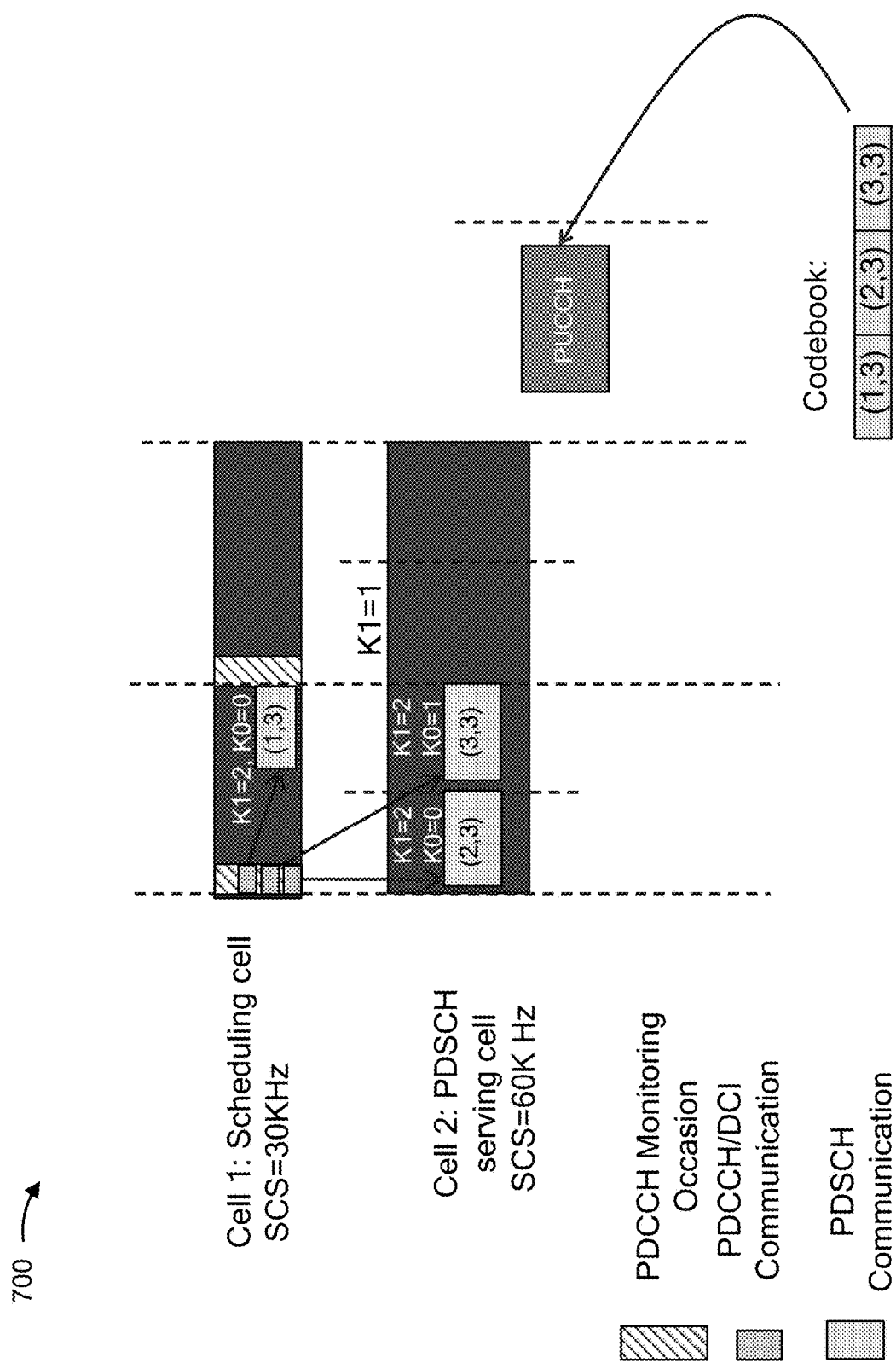
FIGS. 7A-7D are diagrams illustrating one or more examples of hybrid automatic repeat request (HARQ) feedback reporting for cross-carrier scheduling, for example, by a BS, in accordance with various aspects of the present disclosure.
Figure 7B:
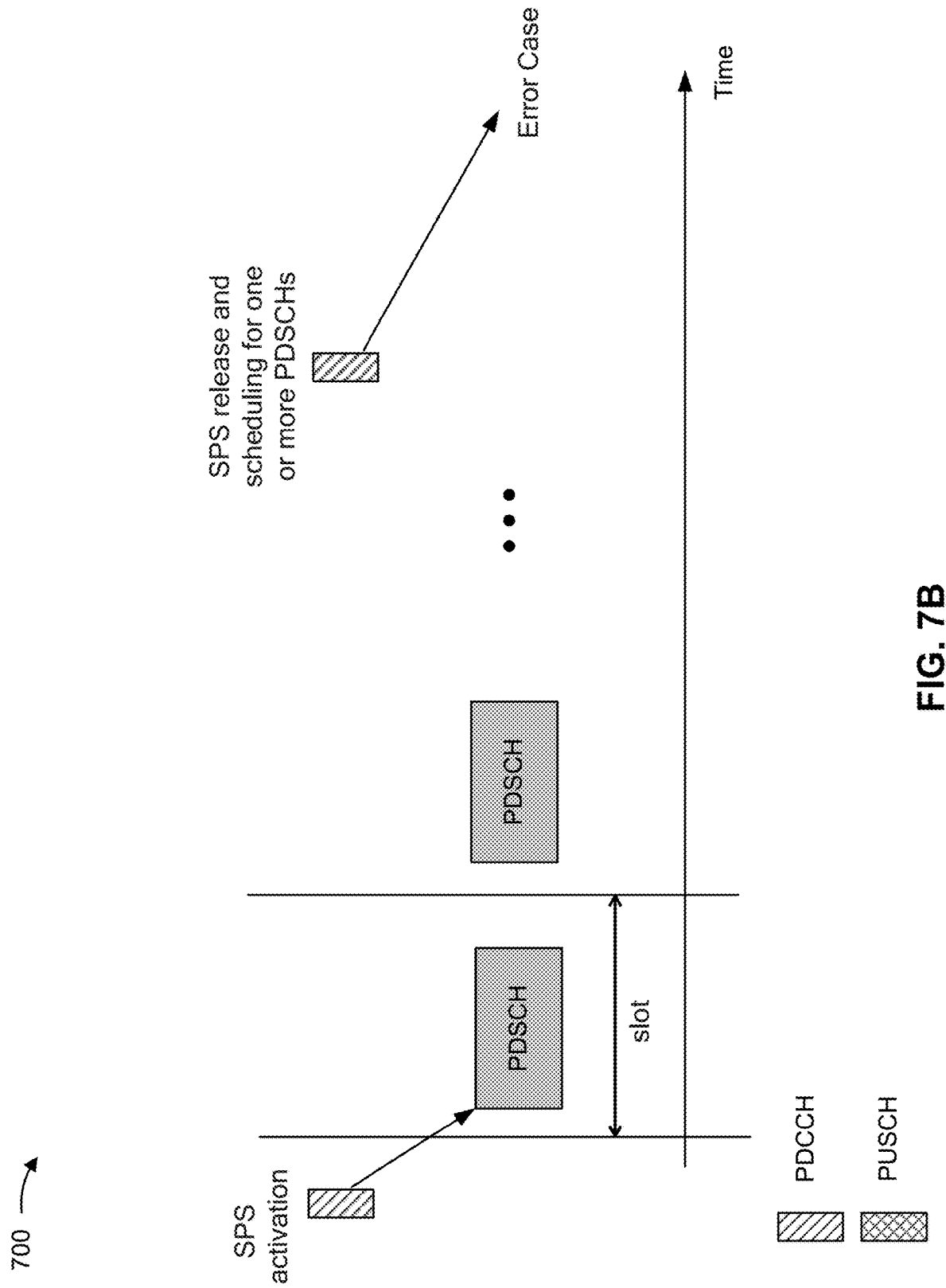
Figure 7C:
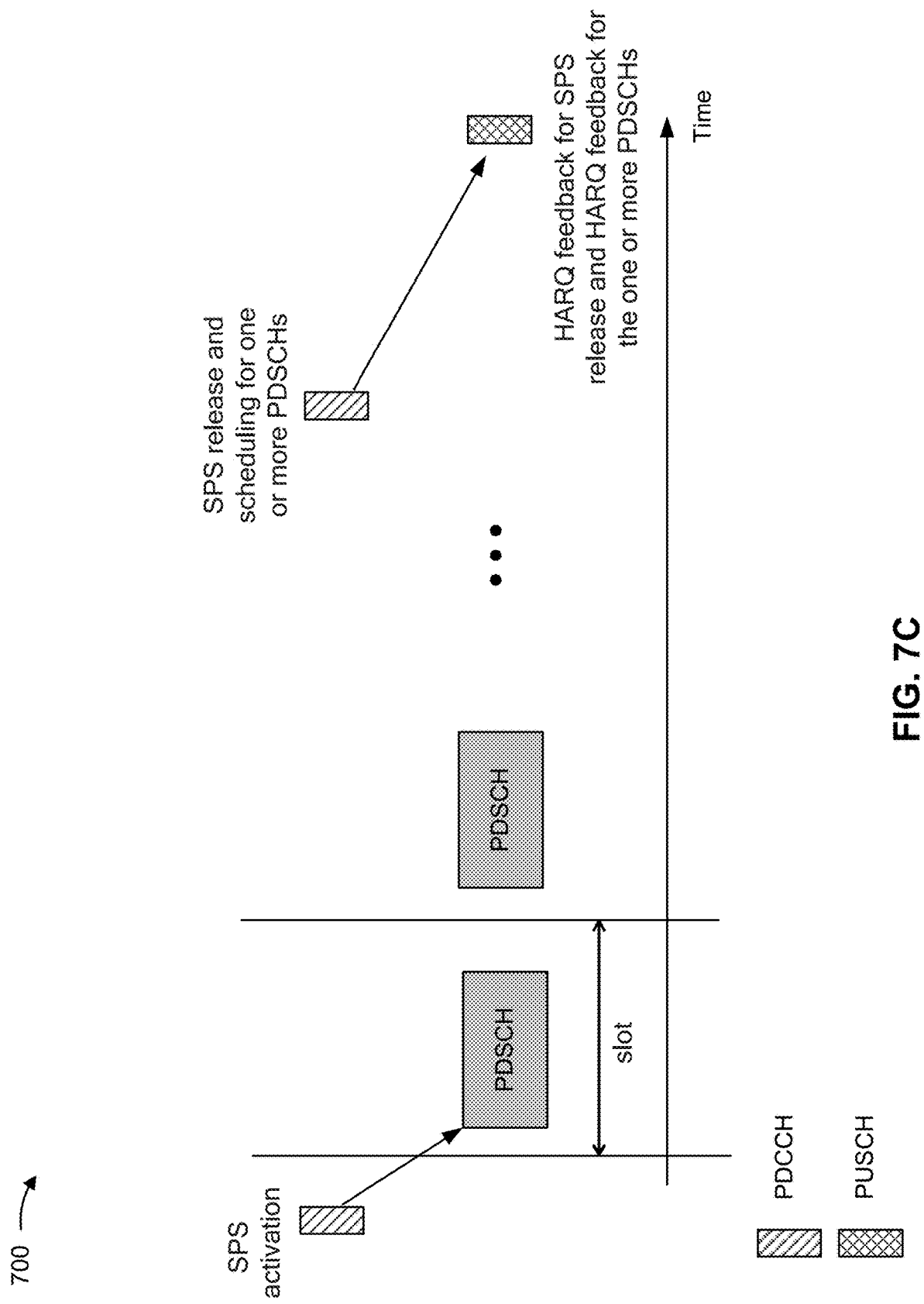
Figure 7D:
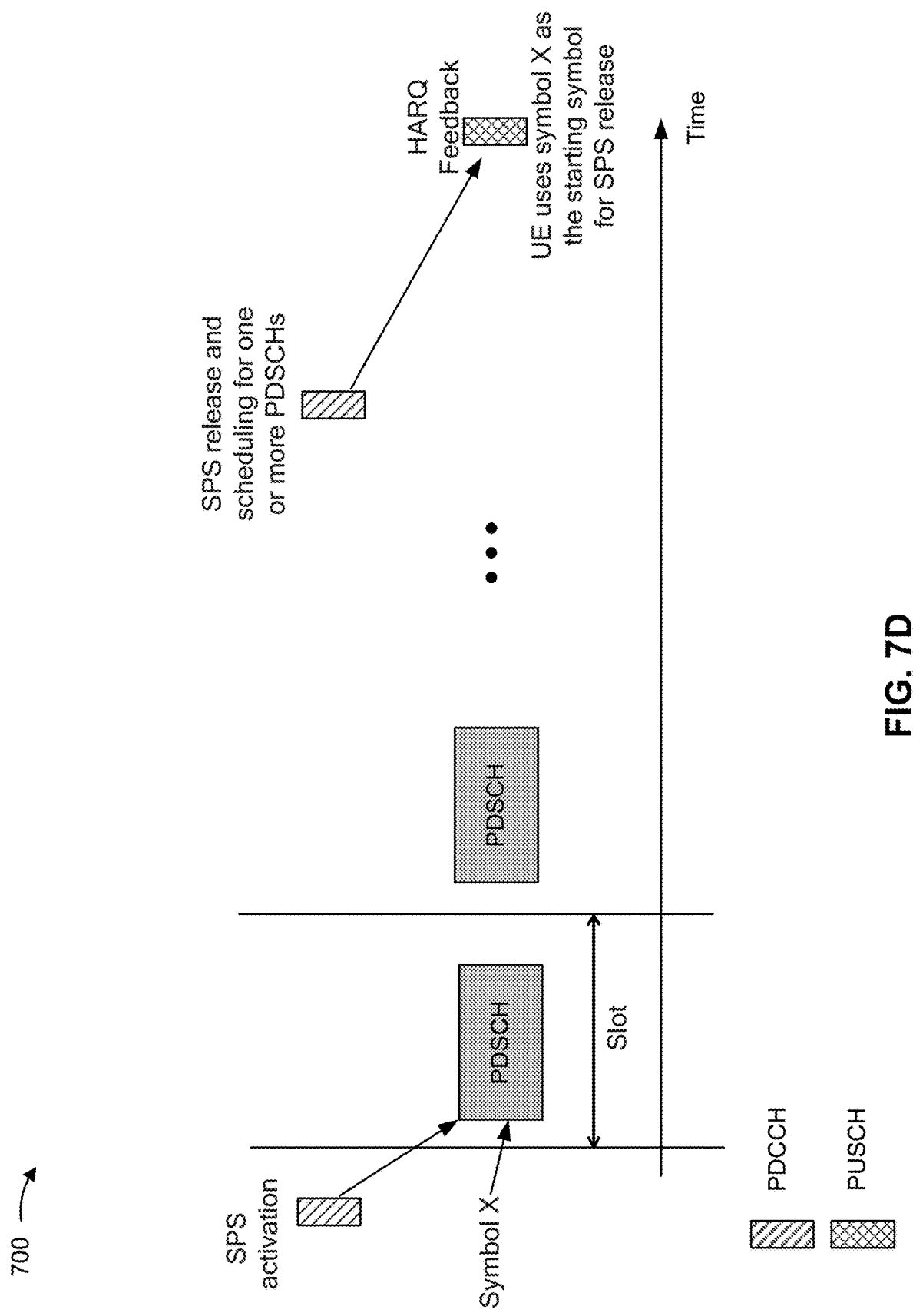
Figure 8:
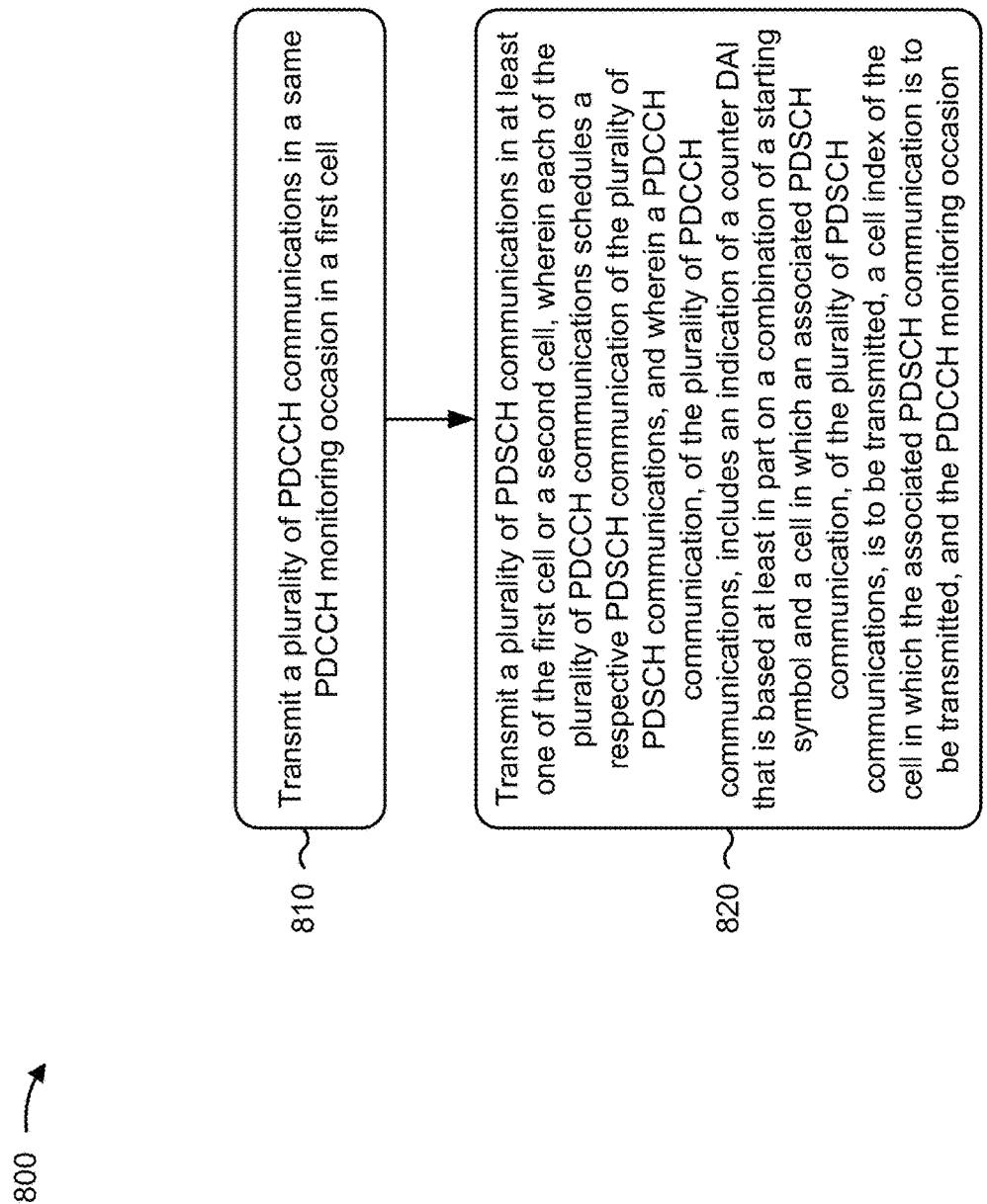
FIG. 8 is a diagram illustrating an example process performed, for example, by a BS, in accordance with various aspects of the present disclosure.

The stored program codes, when executed by processor 280 and/or other processors and modules at UE 120, may cause the UE 120 to perform operations described with respect to process 700 of FIG. 7, process 800 of FIG. 8, and/or other processes as described herein. The stored program codes, when executed by processor 240 and/or other processors and modules at base station 110, may cause the base station 110 to perform operations described with respect to process 700 of FIG. 7, process 800 of FIG. 8, and/or other processes as described herein. A scheduler 246 may schedule UEs for data transmission on the downlink and/or uplink.

In some aspects, UE 120 may include means for receiving a plurality of PDCCH communications in a same PDCCH monitoring occasion in a first cell, means for receiving a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter downlink assignment index (DAI) that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion, and/or the like.

In some aspects, UE 120 may include means for receiving, in a same PDCCH monitoring occasion, a first PDCCH communication that schedules a downlink SPS release and one or more second PDCCH communications that each schedule respective PDSCH communications, means for transmitting HARQ feedback for the downlink SPS release and HARQ feedback for the respective PDSCH communications in the same slot, and/or the like. In some aspects, UE 120 may include means for receiving, in a same PDCCH monitoring occasion, a first PDCCH communication that schedules a downlink SPS release and one or more second PDCCH communications that each schedule respective PDSCH communications, means for determining that an error has occurred based at least in part on at least one of the UE 120 being scheduled to transmit HARQ feedback for the downlink SPS release and HARQ feedback for the respective PDSCH communications in the same slot or the first PDCCH communication and the one or more second PDCCH communications being received in the same PDCCH monitoring occasion, and/or the like. In some aspects, such means may include one or more components of UE 120 described in connection with FIG. 2.

In some aspects, base station 110 may include means for transmitting a plurality of PDCCH communications in a same PDCCH monitoring occasion in a first cell, means for transmitting a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
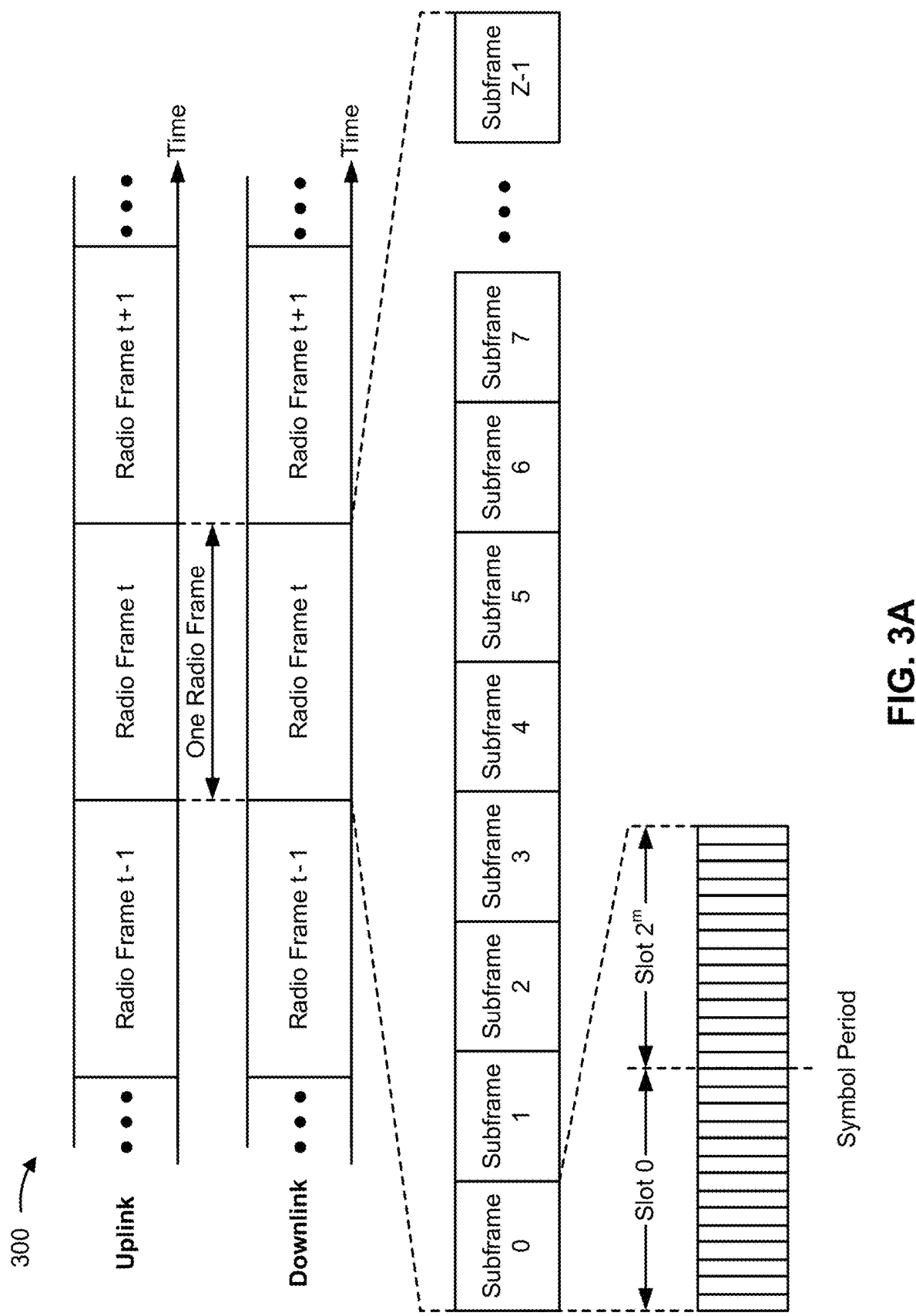
FIG. 3A is a block diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for frequency division duplexing (FDD) may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
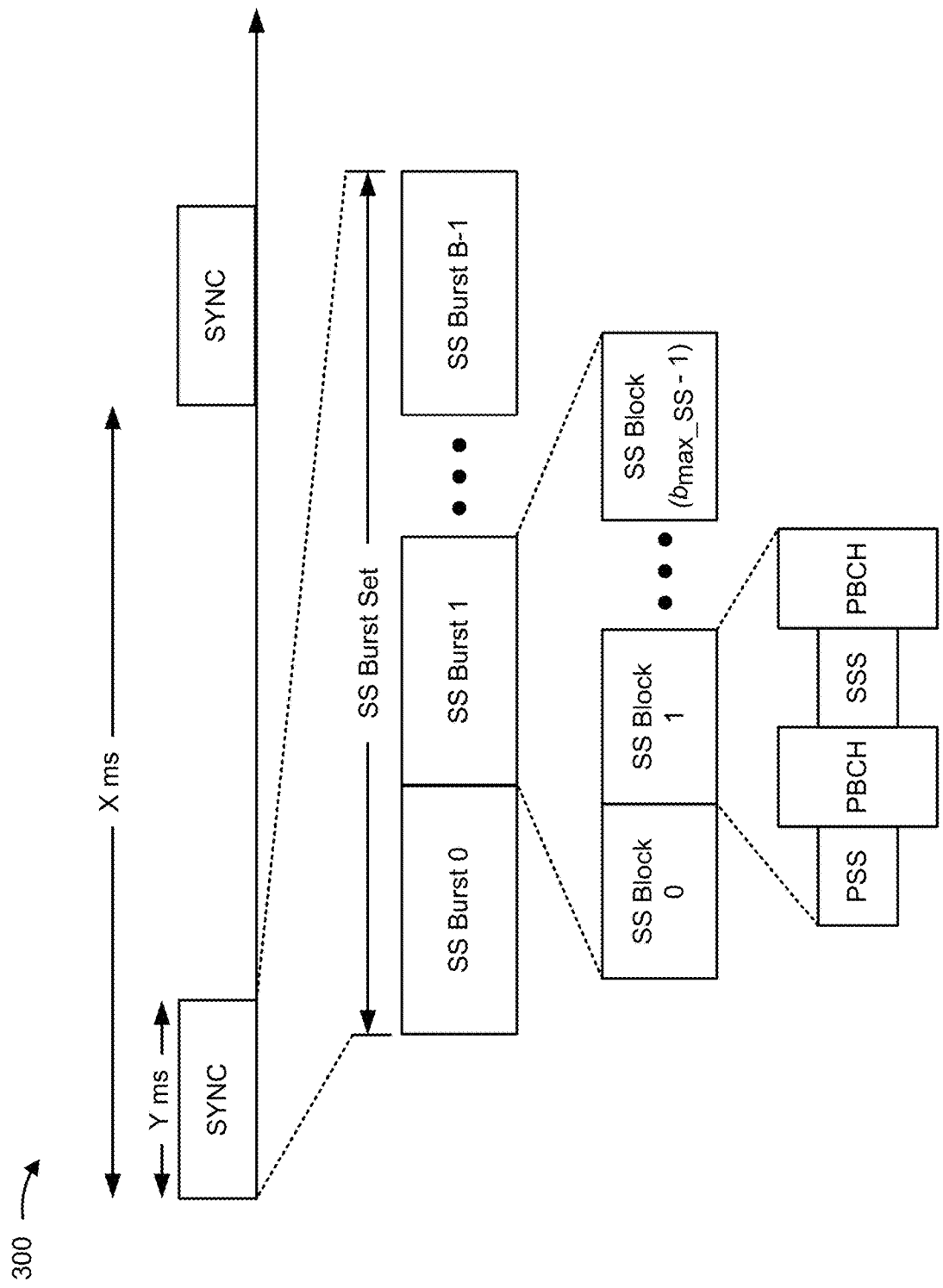
FIG. 3B is a block diagram illustrating an example synchronization communication hierarchy in a wireless communication network, in accordance with various aspects of the present disclosure.

FIG. 3B is a block diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
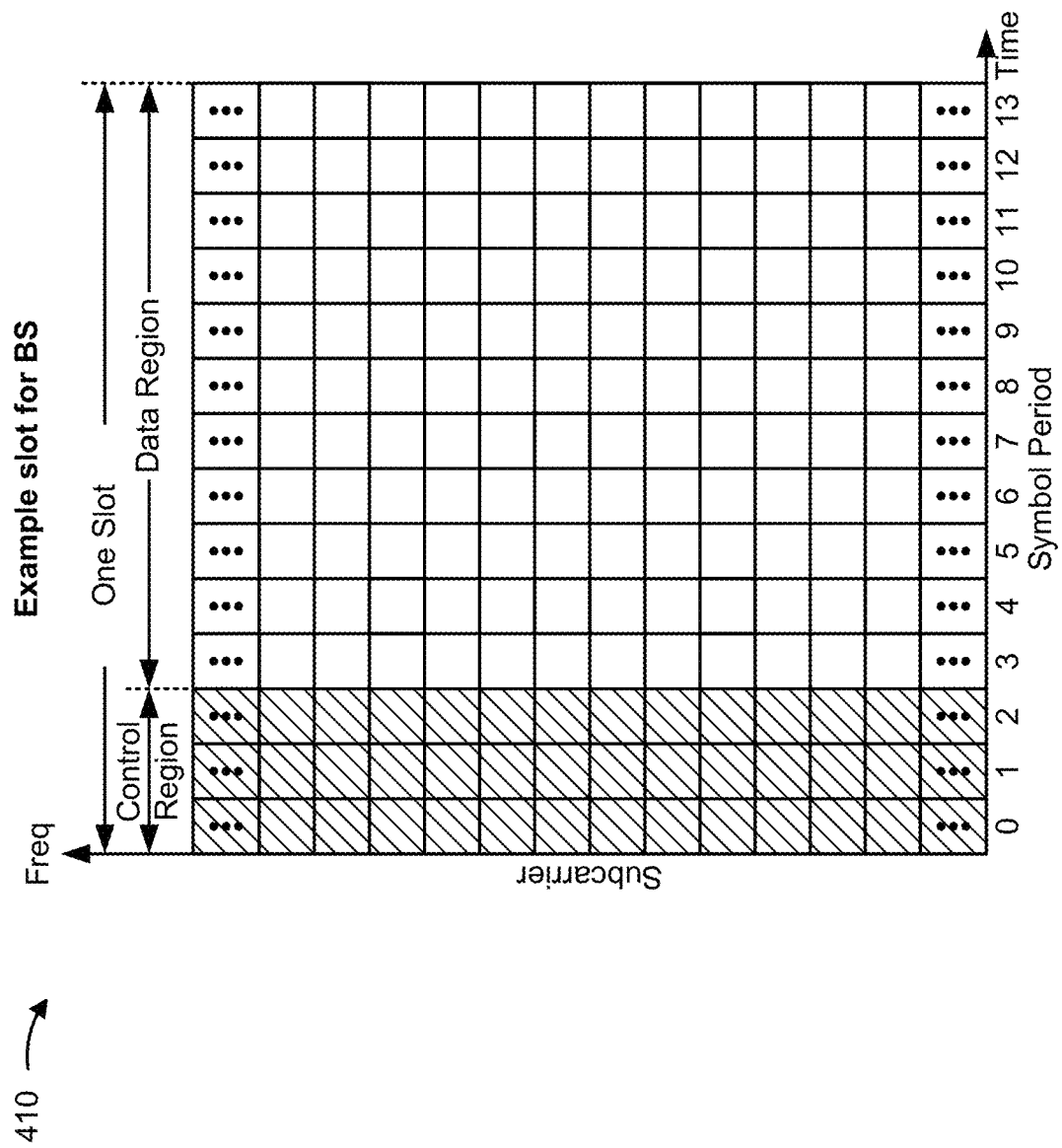
FIG. 4 is a block diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
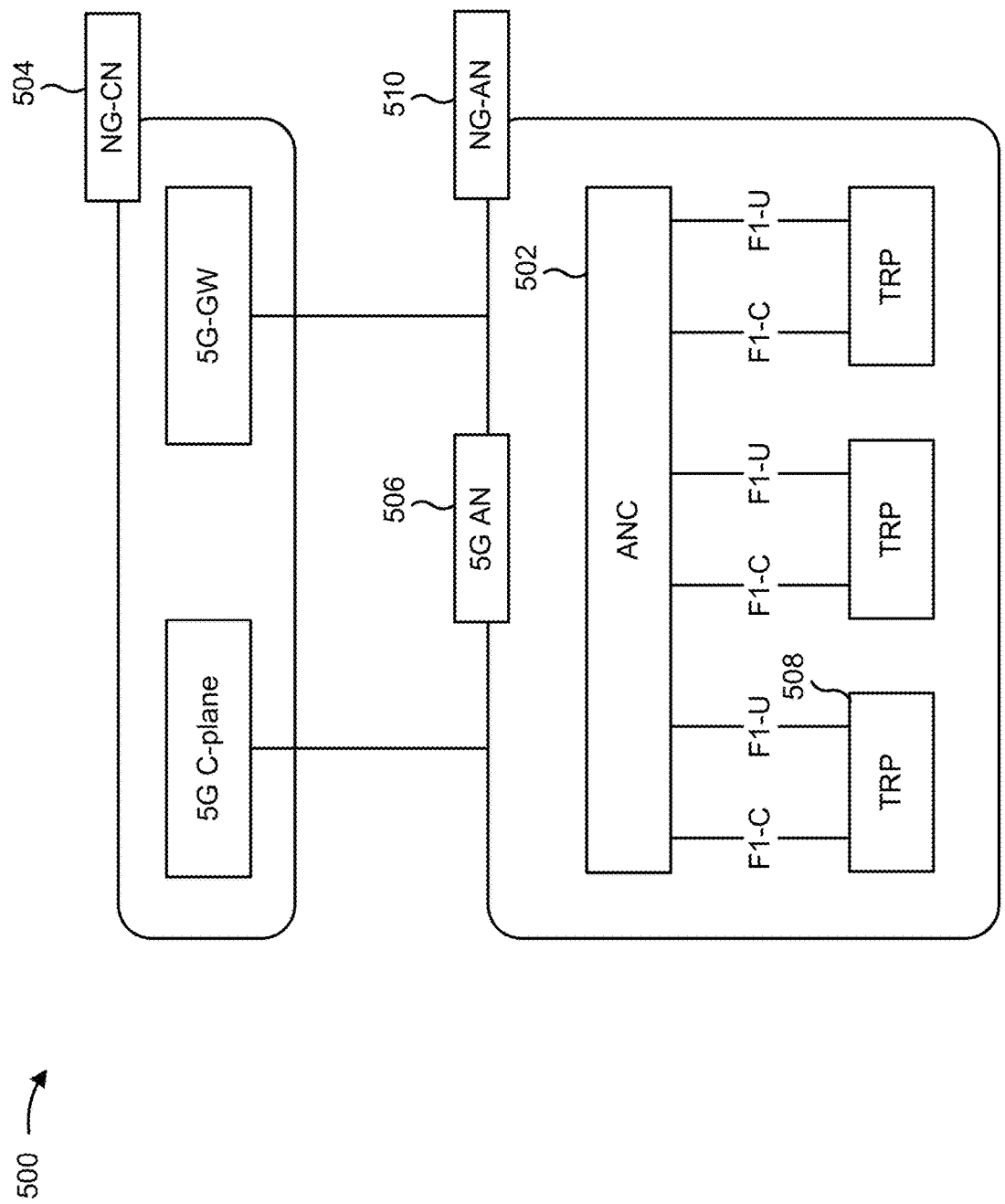
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
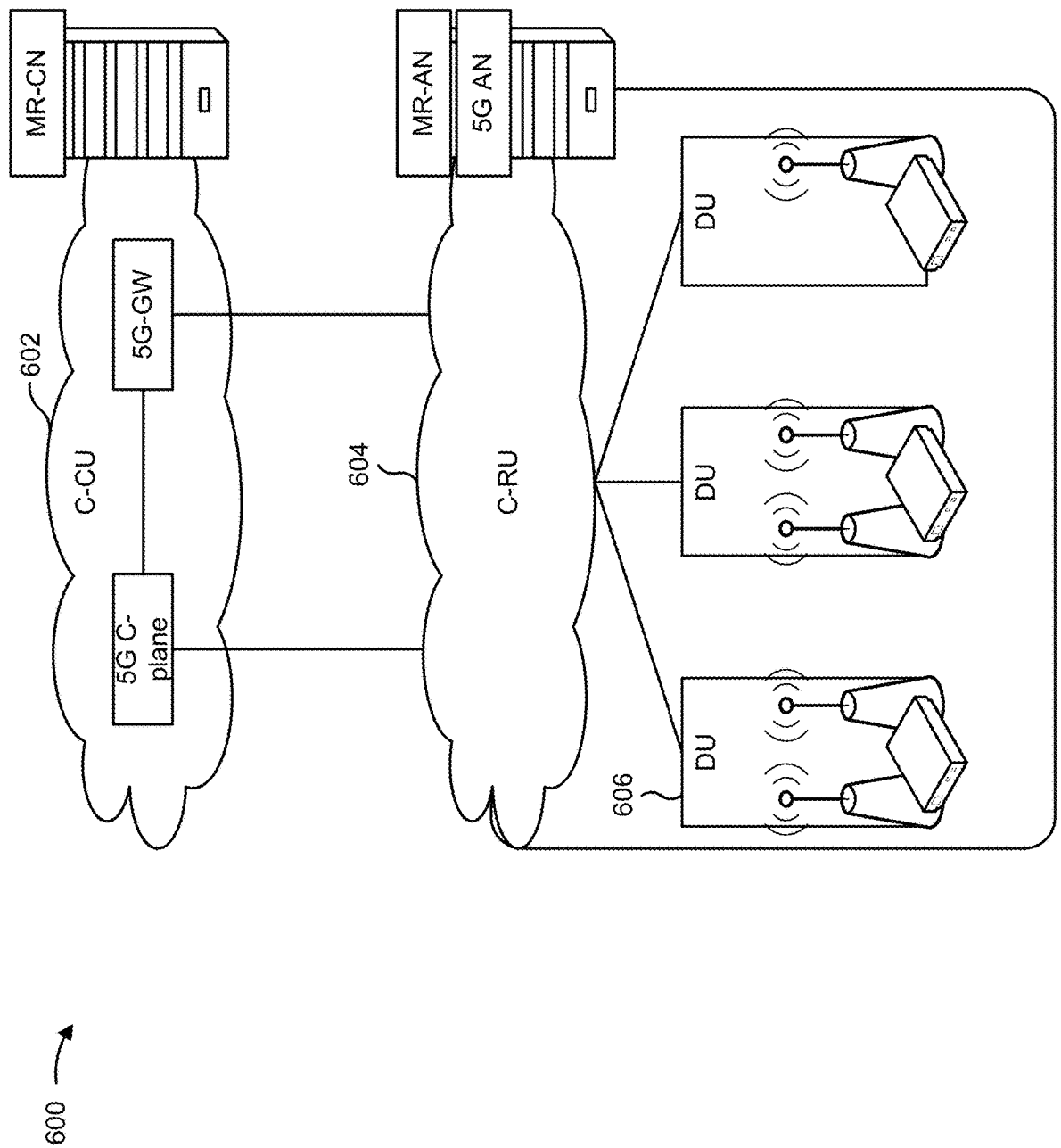
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

FIGS. 7A-7D are diagrams illustrating one or more examples 700 of HARQ feedback reporting for cross-carrier scheduling. In some aspects, example(s) 700 may include communication between a UE (e.g., UE 120) and a BS (e.g., BS 110).

In some aspects, the BS may increment a counter DAI for a plurality of PDCCH communications transmitted in a same PDCCH monitoring occasion in a scheduling cell that schedules PDSCH communications in a PDSCH serving cell and/or the scheduling cell. The BS may increment the counter DAI in an order that includes 1) a combination of the starting symbols for all PDSCH communications associated with the same PDCCH monitoring occasion and the cell in which the PDSCH communications are transmitted (e.g., in ascending order), 2) the cell index associated with the cell in which PDSCH communications associated with the same PDCCH monitoring occasion are transmitted (e.g., in ascending order), and 3) the PDCCH monitoring occasion (e.g., in ascending order).

In some aspects, the ordering of the counter DAI may be based at least in part on, for PDSCHs on the same cell and scheduled using the same PDCCH monitoring occasion, the starting symbol index of the corresponding PDSCHs to order the counter DAI and DCI may be first. For PDSCHs on different cell but same monitoring occasion, the cell index to order counter DAI and DCI may be second. For PDSCHs associated with different PDCCH monitoring occasion, the monitoring occasion index may be third. Accordingly, the UE and the BS may each determine the ordering of the counter DAI as described herein. In some aspects, the UE determines the ordering of the counter DAI to detect missing DAIS and/or for other purposes described herein.

As an example, the BS may transmit a plurality of PDCCH communications (e.g., PDCCH communication 1, PDCCH communication 2, and PDCCH communication 3) in the same PDCCH monitoring occasion, where each of the PDCCH communications schedules a respective PDSCH communication (e.g., PDSCH communication 1, PDSCH communication 2, and PDSCH communication 3). The BS may schedule PDSCH communication 2 to be transmitted in cell 1, and may schedule PDSCH communication 1 and PDSCH communication 3 to be transmitted in cell 2. Moreover, the BS may schedule PDSCH communication 2 and PDSCH communication 3 with the same starting symbol, and may schedule PDSCH communication 1 with a starting symbol that occurs prior to the starting symbol of PDSCH communication 2 and PDSCH communication 3.

In this example, the BS may configure PDCCH communication 2 to include a counter DAI and total DAI pair of (1,3) because PDSCH communication 2 is scheduled to be transmitted in cell 1. In this case, the counter DAI of PDCCH communication 2 is 1 because cell 1 is the lowest cell index associated with the PDCCH monitoring occasion, and the total DAI is 3 because three PDSCH communications are associated with the PDCCH monitoring occasion. The BS may configure PDCCH communication 1 to include a counter DAI and total DAI pair of (2,3). In this case, the counter DAI of PDCCH communication 1 may be 2 because PDSCH communication 1 is scheduled to be transmitted in cell 2 (which is a cell index greater than cell 1), and because PDSCH communication 1 is scheduled to be transmitted in a starting symbol that occurs prior to the starting symbol of PDSCH communication 3 in the same cell. The BS may configure PDCCH communication 3 to include a counter DAI and total DAI pair of (3,3). In this case, the counter DAI of PDCCH communication 3 may be 3 because PDSCH communication 3 is scheduled to be transmitted in cell 2 (which is a cell index greater than cell 1), and because PDSCH communication 3 is scheduled to be transmitted in a starting symbol that occurs after to the starting symbol of PDSCH communication 1 in the same cell.

In some cases, the BS may transmit a downlink semi-persistent scheduling (SPS) release to the UE, which may release previously scheduled downlink SPS transmissions. The UE may be scheduled to transmit HARQ feedback for the downlink SPS release. However, because there may be no corresponding PDSCH communication scheduled by the downlink SPS release, the UE may be unable to determine a starting symbol for the HARQ feedback for the downlink SPS release. Moreover, the UE may be unable to determine whether to transmit the HARQ feedback for the downlink SPS release if the downlink SPS release is received in the same PDCCH monitoring occasion with other PDCCH communications that schedule corresponding PDSCH communications. If the UE is to transmit HARQ feedback for the downlink SPS release, the UE may be unable to determine whether to transmit the HARQ feedback for the downlink SPS prior to or after HARQ feedback for the PDSCH communications.

As shown in FIG. 7B, the UE may receive a downlink SPS activation. The downlink SPS activation may be indicated in a PDCCH communication or a DCI communication.

The SPS activation may semi-persistently schedule one or more PDSCH communications for the UE. In some aspects, the SPS activation may be received in a scheduling cell (e.g., Cell 1), and the one or more PDSCH communications may be scheduled to be transmitted in a PDSCH serving cell (e.g., Cell 2).

As further shown in FIG. 7B, the UE may subsequently receive a PDCCH communication or a DCI communication that indicates a downlink SPS release. The downlink SPS release may release the semi-persistent scheduling for the UE that was activated by the downlink SPS activation. Moreover, the UE may receive one or more PDCCH communications or DCI communications that each schedule one or more PDSCH communications for the UE. In some aspects, the UE may receive the PDCCH communication that indicates the downlink SPS release, and the one or more PDCCH communications that schedule the one or more PDSCH communications, in the same PDCCH monitoring occasion. In some aspects, the UE may receive the PDCCH communication that indicates the downlink SPS release and the one or more PDCCH communications that schedule the one or more PDSCH communications in the same downlink serving cell (e.g., Cell 1—the scheduling cell).

The UE may be scheduled (e.g., by the BS, by another wireless communication device, by a configuration stored by the UE, and/or the like) to transmit HARQ feedback for the downlink SPS release. Moreover, the UE may be scheduled (e.g., by the BS, by another wireless communication device, by a configuration stored by the UE, and/or the like) to transmit HARQ feedback for the one or more PDSCH communications scheduled by the one or more PDCCH communications. In some aspects, the UE may be scheduled to transmit the HARQ feedback for the downlink SPS release and the HARQ feedback for the one or more PDSCH communications in the same slot.

As shown in FIG. 7B, in some aspects, the UE may determine that an error has occurred based at least in part on the UE being scheduled to transmit the HARQ feedback for the downlink SPS release and the HARQ feedback for the one or more PDSCH communications in the same slot. In some aspects, the UE may determine that an error occurred based at least in part on the first PDCCH communication and the one or more second PDCCH communications being received in the same PDCCH monitoring occasion. In these examples, the UE may perform one or more implementation-specific actions based at least in part on determining that an error has occurred. For example, the UE may refrain from transmitting the HARQ feedback for the downlink SPS release and the HARQ feedback for the one or more PDSCH communications in the same slot based at least in part on determining that the error has occurred. As another example, the UE may transmit the HARQ feedback for the downlink SPS release and the HARQ feedback for the one or more PDSCH communications in different slots based at least in part on determining that the error has occurred. In these cases, the UE may transmit the HARQ feedback for the downlink SPS release in a first slot and may transmit the HARQ feedback for the one or more PDSCH communications in a second slot. The first slot may occur before the second slot, or the second slot may occur before the first slot.

As shown in FIG. 7C, in some aspects, the UE may transmit the HARQ feedback for the downlink SPS release and the HARQ feedback for the one or more PDSCH communications in the same slot. In some aspects, the UE may transmit the HARQ feedback for the downlink SPS release in the slot prior to transmitting the HARQ feedback for the one or more PDSCH communications in the slot. In some aspects, the UE may transmit the HARQ feedback for the one or more PDSCH communications in the slot prior to transmitting the HARQ feedback for the downlink SPS release in the slot. In some aspects, the order in which to transmit the HARQ feedback for the downlink SPS release and the HARQ feedback for the one or more PDSCH communications may be indicated in signaling from the BS, may be indicated in a configuration stored by the UE, may be indicated in a wireless communication standard or wireless communication specification, and/or the like.

In some aspects, to transmit the HARQ feedback transmitting the HARQ feedback for the downlink SPS release and the HARQ feedback for the respective PDSCH communications in the same slot, the UE may multiplex a HARQ feedback bit for the downlink SPS release with HARQ feedback bits for the respective PDSCH communications in a same HARQ codebook. In some aspects, the UE may order the bits in the HARQ codebook such that the HARQ feedback bit for the downlink SPS release is ordered before the HARQ feedback bits for the respective PDSCH communications in the same HARQ codebook. In some aspects, the UE may order the bits the HARQ codebook such that the HARQ feedback bits for the respective PDSCH communications are ordered before the HARQ feedback bit for the downlink SPS release in the same HARQ codebook.

As shown in FIG. 7D, the UE may determine a starting symbol for the HARQ feedback for the downlink SPS release. In some aspects, the UE may determine the starting symbol based at least in part on the downlink SPS activation. For example, the UE may determine the starting symbol to be (or to correspond to) a starting symbol indicated by the downlink SPS activation. The starting symbol indicated by the downlink SPS activation (e.g., symbol X may be a symbol number relative to the beginning of a slot for each of the PDSCH communications semi-statically scheduled by the downlink SPS activation). In other words, the downlink SPS activation may indicate that a PDSCH communication is to start on the Xth symbol (e.g., third symbol, fifth symbol, among other examples) from the symbol 0 in each slot or in every Y slots (e.g., every second slot, every fourth slot, among other examples). Moreover, the UE may determine a K0 value (e.g., a quantity of slots from the slot in which the PDCCH monitoring occasion occurred) for the downlink SPS release to be K0=0. In this way, the UE may increment a counter DAI for HARQ feedback based at least in part on the starting symbol for the downlink SPS release and the starting symbols for the one or more PDSCH communications, based at least in part on the K0 value for the downlink SPS release and the K0 values for the one or more PDSCH communications, and/or the like.

As indicated above, FIGS. 7A-7D are provided merely as one or more examples. Other examples may differ from what is described with regard to FIGS. 7A-7D.

FIG. 8 is a diagram illustrating an example process 800 performed, for example, by a BS, in accordance with various aspects of the present disclosure. Example process 800 is an example where the BS (e.g., BS 110) performs operations associated with HARQ feedback reporting for cross-carrier scheduling.

As shown in FIG. 8, in some aspects, process 800 may include transmitting a plurality of PDCCH communications in a same PDCCH monitoring occasion in a first cell (block 810). For example, the BS (e.g., using transmit processor 220, receive processor 238, controller/processor 240, memory 242, and/or the like) may transmit a plurality of PDCCH communications in a same PDCCH monitoring occasion in a first cell, as described above.

As further shown in FIG. 8, in some aspects, process 800 may include transmitting a plurality of PDSCH communications in at least one of the first cell or a second cell, wherein each of the plurality of PDCCH communications schedules a respective PDSCH communication of the plurality of PDSCH communications, wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion (block 820). For example, the BS (e.g., using transmit processor 220, receive processor 238, controller/processor 240, memory 242, and/or the like) may transmit a plurality of PDSCH communications in at least one of the first cell or a second cell, as described above. In some aspects, each of the plurality of PDCCH communications schedules a respective PDSCH communication of the plurality of PDSCH communications. In some aspects, a PDCCH communication, of the plurality of PDCCH communications, includes an indication of a counter DA) that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

Process 800 may include additional aspects, such as any single aspect or any combination of aspects described below and/or in connection with one or more other processes described elsewhere herein.

In a first aspect, the first cell and the second cell are configured with different subcarrier spacings. In a second aspect, alone or in combination with the first aspect, the first cell is a scheduling cell and the second cell is a PDSCH serving cell. In a third aspect, alone or in combination with one or more of the first and second aspects, the PDCCH communication includes an indication of a total DAI that is based at least in part on a quantity of the plurality of PDCCH communications.

In a fourth aspect, alone or in combination with one or more of the first through third aspects, the PDCCH communication includes a first PRI, another PDCCH communication of the plurality of PDCCH communications includes a second PM that is different from the first PRI, and process 800 includes determining that the counter DAI, indicated in the PDCCH communication, is a highest counter DAI value among the plurality of PDCCH communications, determining, based at least in part on the counter DAI being the highest counter DAI value among the plurality of PDCCH communications, a slot in which HARQ feedback is to be transmitted for the plurality of PDCCH communications and the plurality of PDSCH communications indicated by the first PRI, and receiving, in the slot, a PUCCH communication that includes the HARQ feedback.

In a fifth aspect, alone or in combination with one or more of the first through fourth aspects, the counter DAI is based at least in part on for PDSCH communications on a same cell and scheduled in a same PDCCH monitoring occasion, a starting symbol index to order the counter DAI and DCI first, for PDSCH communications on a different cell and scheduled in a same PDCCH monitoring occasion, a cell index to order counter DAI and DCI second, and for PDSCH communications on a different cell and scheduled in a different PDCCH monitoring occasion, a monitoring occasion index third.

In a sixth aspect, alone or in combination with one or more of the first through fifth aspects, each of the plurality of PDCCH communications includes a physical uplink control channel resource indicator (PM) that identifies a slot in which hybrid automatic repeat request feedback is to be transmitted for the plurality of PDCCH communications and the plurality of PDSCH communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
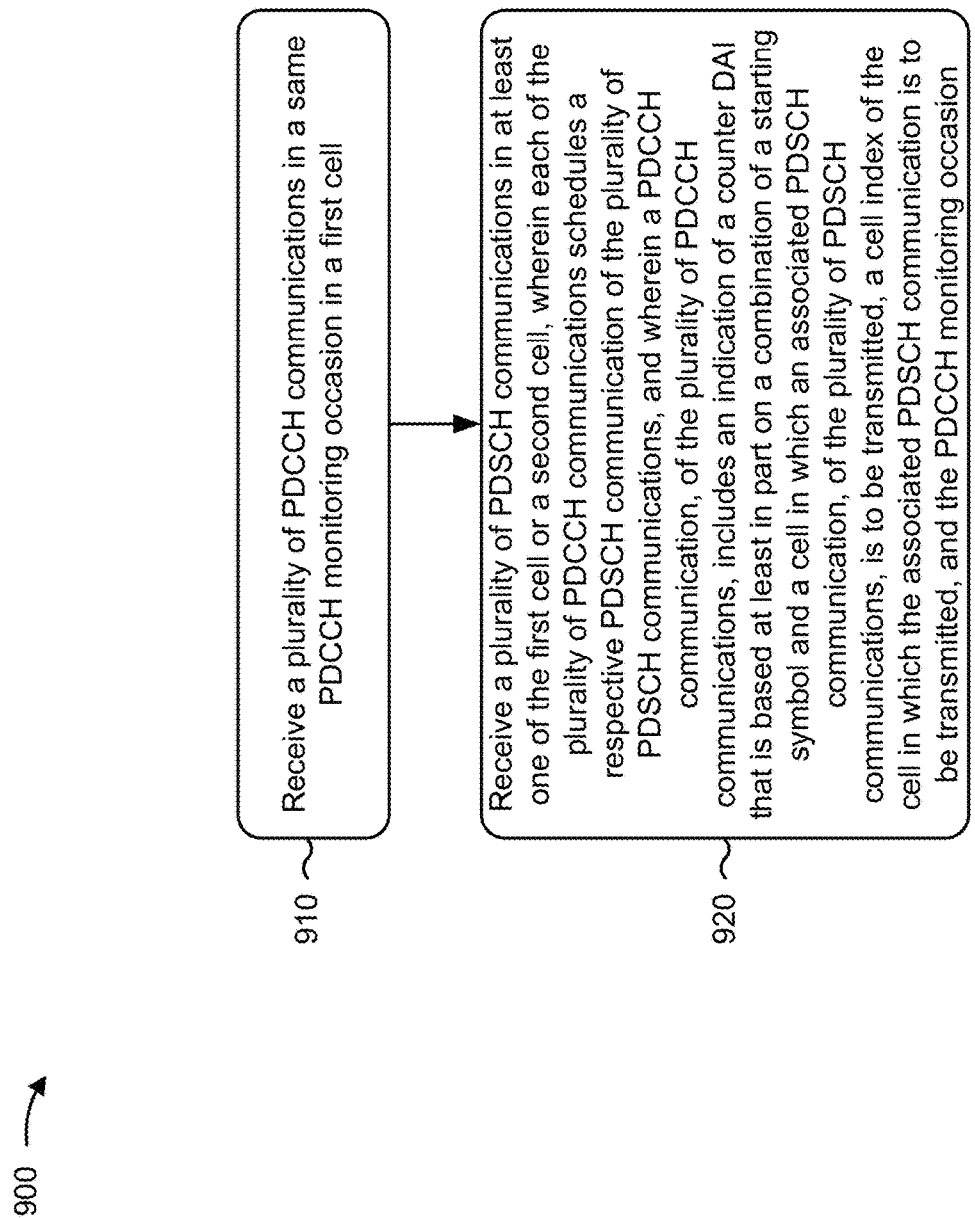
FIGS. 9-11 are diagrams illustrating example processes performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120) performs operations associated with HARQ feedback reporting for cross-carrier scheduling.

As shown in FIG. 9, in some aspects, process 900 may include receiving a plurality of PDCCH communications in a same PDCCH monitoring occasion in a first cell (block 910). For example, the UE (e.g., using receive processor 258, transmit processor 264, controller/processor 280, memory 282, and/or the like) may receive a plurality of PDCCH communications in a same PDCCH monitoring occasion in a first cell, as described above.

As further shown in FIG. 9, in some aspects, process 900 may include receiving a plurality of PDSCH communications in at least one of the first cell or a second cell, wherein each of the plurality of PDCCH communications schedules a respective PDSCH communication of the plurality of PDSCH communications, and wherein a PDCCH communication, of the plurality of PDCCH communications, includes an indication of a counter DAI that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion (block 920). For example, UE (e.g., using receive processor 258, transmit processor 264, controller/processor 280, memory 282, and/or the like) may receive a plurality of PDSCH communications in at least one of the first cell or a second cell, as described above. In some aspects, each of the plurality of PDCCH communications schedules a respective PDSCH communication of the plurality of PDSCH communications. In some aspects, a PDCCH communication, of the plurality of PDCCH communications, includes an indication of a counter downlink assignment index (DAI) that is based at least in part on a combination of a starting symbol and a cell in which an associated PDSCH communication, of the plurality of PDSCH communications, is to be transmitted, a cell index of the cell in which the associated PDSCH communication is to be transmitted, and the PDCCH monitoring occasion.

Process 900 may include additional aspects, such as any single aspect or any combination of aspects described below and/or in connection with one or more other processes described elsewhere herein.

In a first aspect, the first cell and the second cell are configured with different subcarrier spacings. In a second aspect, alone or in combination with the first aspect, the first cell is a scheduling cell and the second cell is a PDSCH serving cell. In a third aspect, alone or in combination with one or more of the first and second aspects, the PDCCH communication includes an indication of a total DAI that is based at least in part on a quantity of the plurality of PDCCH communications.

In a fourth aspect, alone or in combination with one or more of the first through third aspects, wherein the PDCCH communication includes a first PM, another PDCCH communication of the plurality of PDCCH communications includes a second PM that is different from the first PM, and process 900 includes determining that the counter DAI, indicated in the PDCCH communication, is a highest counter DAI value among the plurality of PDCCH communications, determining, based at least in part on the counter DAI being the highest counter DAI value among the plurality of PDCCH communications, a slot in which hybrid automatic repeat request (HARQ) feedback is to be transmitted for the plurality of PDCCH communications and the plurality of PDSCH communications indicated by the first PRI, and transmitting, in the slot, a PUCCH communication that includes the HARQ feedback.

In a fifth aspect, alone or in combination with one or more of the first through fourth aspects, the counter DAI is based at least in part on for PDSCH communications on a same cell and scheduled in a same PDCCH monitoring occasion, a starting symbol index to order the counter DAI and DCI first, for PDSCH communications on a different cell and scheduled in a same PDCCH monitoring occasion, a cell index to order counter DAI and DCI second, and for PDSCH communications on a different cell and scheduled in a different PDCCH monitoring occasion, a monitoring occasion index third.

In a sixth aspect, alone or in combination with one or more of the first through fifth aspects, each of the plurality of PDCCH communications includes a physical uplink control channel resource indicator (PM) that identifies a slot in which hybrid automatic repeat request feedback is to be transmitted for the plurality of PDCCH communications and the plurality of PDSCH communications.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
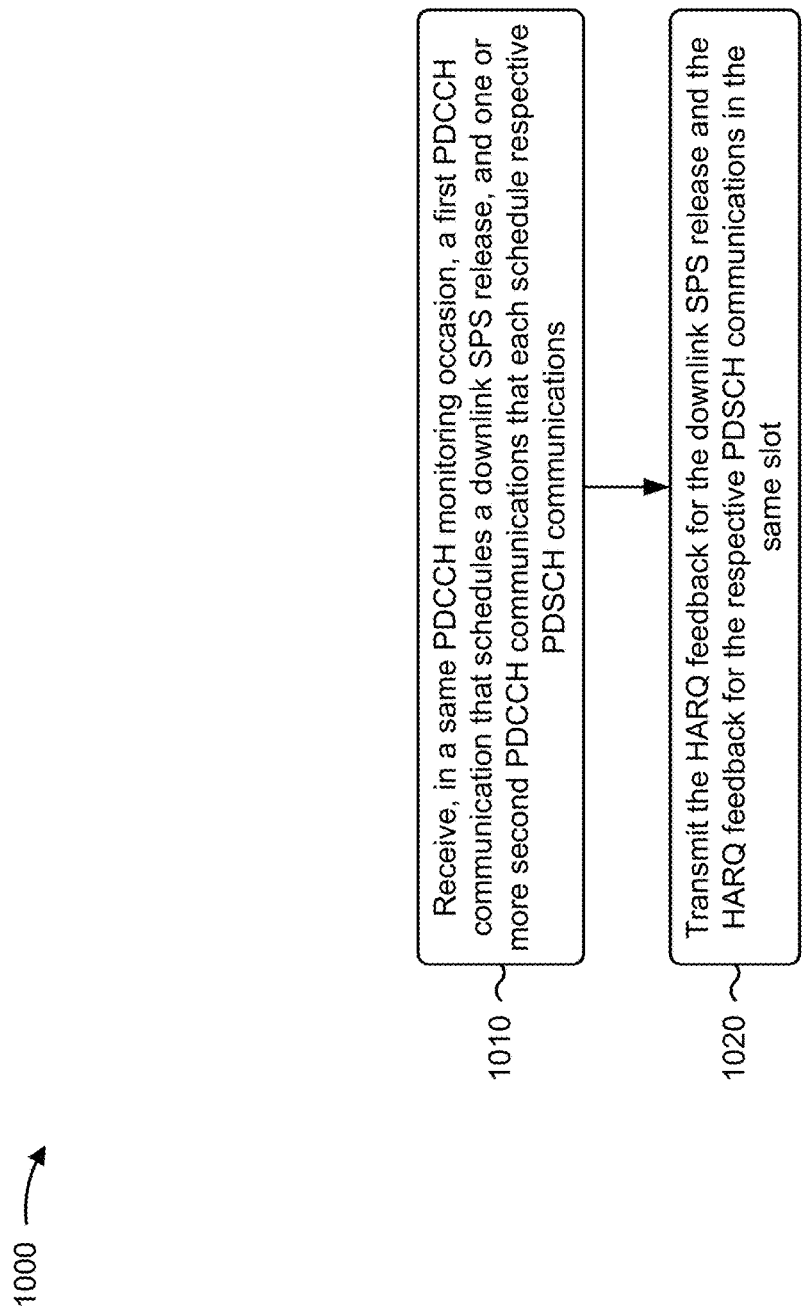

FIG. 10 is a diagram illustrating an example process 1000 performed, for example, by a UE, in accordance with various aspects of the present disclosure. Example process 1000 is an example where the UE (e.g., UE 120 and/or the like) performs operations associated with HARQ feedback reporting for cross-carrier scheduling.

As shown in FIG. 10, in some aspects, process 1000 may include receiving, in a same PDCCH monitoring occasion, a first PDCCH communication that schedules a downlink SPS release, and one or more second PDCCH communications that each schedule respective PDSCH communications (block 1010). For example, the UE (e.g., using receive processor 258, transmit processor 264, controller/processor 280, memory 282, and/or the like) may receive, in a same PDCCH monitoring occasion, a first PDCCH communication that schedules a downlink SPS release, and one or more second PDCCH communications that each schedule respective PDSCH communications, as described above.

As further shown in FIG. 10, in some aspects, process 1000 may include transmitting HARQ feedback for the downlink SPS release and HARQ feedback for the respective PDSCH communications in the same slot (block 1020). For example, the UE (e.g., using receive processor 258, transmit processor 264, controller/processor 280, memory 282, and/or the like) may transmit HARQ feedback for the downlink SPS release and HARQ feedback for the respective PDSCH communications in the same slot, as described above.

Process 1000 may include additional aspects, such as any single aspect or any combination of aspects described below and/or in connection with one or more other processes described elsewhere herein.

In a first aspect, transmitting the HARQ feedback for the downlink SPS release and the HARQ feedback for the respective PDSCH communications in the same slot includes multiplexing a HARQ feedback bit for the downlink SPS release with HARQ feedback bits for the respective PDSCH communications in a same HARQ codebook, wherein the HARQ feedback bit for the downlink SPS release is ordered before the HARQ feedback bits for the respective PDSCH communications in the same HARQ codebook. In a second aspect, alone or in combination with the first aspect, transmitting the HARQ feedback for the downlink SPS release and the HARQ feedback for the respective PDSCH communications in the same slot includes multiplexing a HARQ feedback bit for the downlink SPS release with HARQ feedback bits for the respective PDSCH communications in a same HARQ codebook, wherein the HARQ feedback bits for the respective PDSCH communications are ordered before the HARQ feedback bit for the downlink SPS release in the same HARQ codebook.

In a third aspect, alone or in combination with one or more of the first and second aspects, process 1000 includes determining a starting symbol for the HARQ feedback for the downlink SPS release to be a starting symbol indicated by a downlink SPS activation. In a fourth aspect, alone or in combination with one or more of the first through third aspects, process 1000 includes determining a slot offset (e.g., K0) associated with the starting symbol for the HARQ feedback for the downlink SPS release to be zero.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
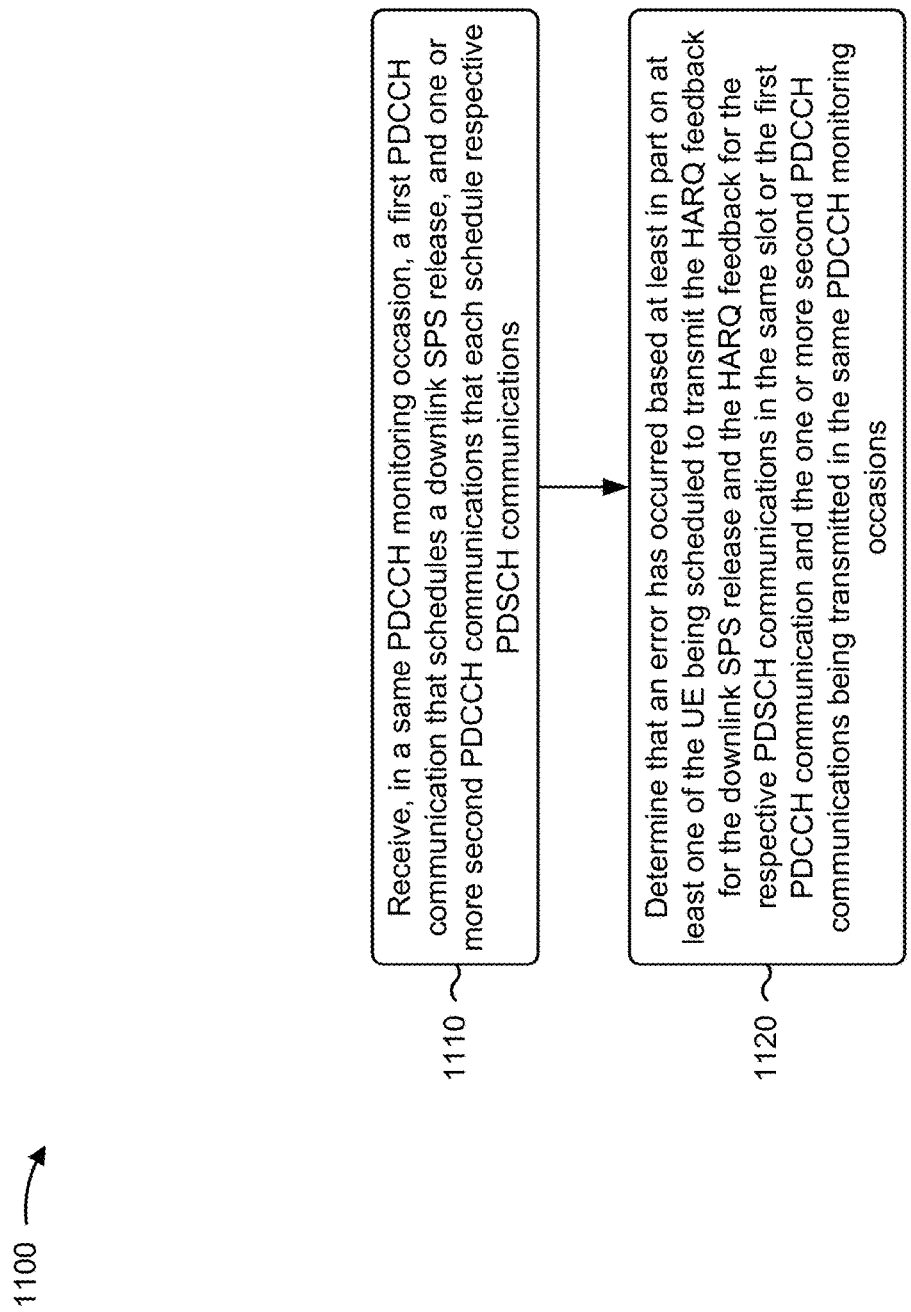

FIG. 11 is a diagram illustrating an example process 1100 performed, for example, by a UE, in accordance with various aspects of the present disclosure. Example process 1100 is an example where the UE (e.g., UE 120 and/or the like) performs operations associated with HARQ feedback reporting for cross-carrier scheduling.

As shown in FIG. 11, in some aspects, process 1100 may include receiving, in a same PDCCH monitoring occasion a first PDCCH communication that schedules a downlink SPS release, and one or more second PDCCH communications that each schedule respective PDSCH communications (block 1110). For example, the UE (e.g., using receive processor 258, transmit processor 264, controller/processor 280, memory 282, and/or the like) may receive, in a same PDCCH monitoring occasion, as described above.

As further shown in FIG. 11, in some aspects, process 1100 may include determining that an error has occurred based at least in part on at least one of the UE being scheduled to transmit HARQ feedback for the downlink SPS release and HARQ feedback for the respective PDSCH communications in the same slot or the first PDCCH communication and the one or more second PDCCH communications being received in the same PDCCH monitoring occasion (block 1120). For example, the UE (e.g., using receive processor 258, transmit processor 264, controller/processor 280, memory 282, and/or the like) may determine that an error has occurred based at least in part on at least one of the UE being scheduled to transmit HARQ feedback for the downlink SPS release and HARQ feedback for the respective PDSCH communications in the same slot or the first PDCCH communication and the one or more second PDCCH communications being received in the same PDCCH monitoring occasion, as described above.

Process 1100 may include additional aspects, such as any single aspect or any combination of aspects described below and/or in connection with one or more other processes described elsewhere herein.

In a first aspect, process 1100 includes refraining from transmitting the HARQ feedback for the downlink SPS release and the HARQ feedback for the respective PDSCH communications in the same slot based at least in part on determining that the error has occurred. In a second aspect, alone or in combination with the first aspect, process 1100 includes transmitting the HARQ feedback for the downlink SPS release in a first slot based at least in part on determining that the error has occurred; and transmitting the HARQ feedback for the respective PDSCH communications in a second slot. In a third aspect, alone or in combination with one or more of the first and second aspects, the first slot occurs before the second slot. In a fourth aspect, alone or in combination with one or more of the first through third aspects, the second slot occurs before the first slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors, coupled to the memory, configured to:
      receive, in a same physical downlink control channel (PDCCH) monitoring occasion and in a same cell:
         a first PDCCH communication that schedules a downlink semi-persistent scheduling (SPS) release, and
         one or more second PDCCH communications that each schedule respective physical downlink shared channel (PDSCH) communications; determine that an error has occurred based at least in part on at least one of:
      the UE being scheduled to transmit hybrid automatic repeat request (HARQ) feedback for the downlink SPS release and HARQ feedback for the respective PDSCH communications in a same slot, or
      the first PDCCH communication and the one or more second PDCCH communications being received in the same PDCCH monitoring occasion, and
   transmit, based at least in part on determining that the error has occurred, the HARQ feedback for the downlink SPS release in a first slot,
      wherein a starting symbol for the HARQ feedback for the downlink SPS release is a particular symbol after a first symbol in the first slot and is based at least in part on an indication provided in a downlink SPS activation associated with the downlink SPS release.

2. The UE of claim 1, wherein the one or more processors are further configured to:
   refrain from transmitting the HARQ feedback for the downlink SPS release and the HARQ feedback for the respective PDSCH communications in the same slot based at least in part on determining that the error has occurred.

3. The UE of claim 1, wherein the one or more processors are further configured to:
transmit, based at least in part on determining that the error has occurred, the HARQ feedback for the respective PDSCH communications in a second slot.

4. The UE of claim 3, wherein the first slot occurs before the second slot.

5. The UE of claim 3, wherein the second slot occurs before the first slot.

6. The UE of claim 3, wherein the UE is scheduled to transmit the HARQ feedback for the respective PDSCH communications is transmitted by a network node.

7. The UE of claim 3, wherein the HARQ feedback for the respective PDSCH communications is transmitted based at least in part on a configuration stored by the UE.

8. The UE of claim 1, wherein the one or more processors are further configured to:
determine the starting symbol for the HARQ feedback for the downlink SPS release based at least in part on the indication provided the downlink SPS activation.

9. The UE of claim 1, wherein the one or more processors are further configured to:
receive the downlink SPS activation,
wherein the first PDCCH communication and the one or more second PDCCH communications are received based at least in part on receiving the downlink SPS activation.

10. A method of wireless communication performed by a user equipment (UE), comprising:
receiving, in a same physical downlink control channel (PDCCH) monitoring occasion and in a same cell:
a first PDCCH communication that schedules a downlink semi-persistent scheduling (SPS) release, and
one or more second PDCCH communications that each schedule respective physical downlink shared channel (PDSCH) communications; and
determining that an error has occurred based at least in part on at least one of:
the UE being scheduled to transmit hybrid automatic repeat request (HARQ) feedback for the downlink SPS release and HARQ feedback for the respective PDSCH communications in a same slot, or
the first PDCCH communication and the one or more second PDCCH communications being received in the same PDCCH monitoring occasion; and
transmit, based at least in part on determining that the error has occurred, the HARQ feedback for the downlink SPS release in a first slot, and the HARQ feedback for the respective PDSCH communications in a second slot,
wherein a starting symbol for the HARQ feedback for the downlink SPS release is a particular symbol after a first symbol in the first slot and is based at least in part on an indication provided in a downlink SPS activation associated with the downlink SPS release.

11. The method of claim 10, further comprising:
refraining from transmitting the HARQ feedback for the downlink SPS release and the HARQ feedback for the respective PDSCH communications in the same slot based at least in part on determining that the error has occurred.

12. The method of claim 10, further comprising:
transmitting, based at least in part on determining that the error has occurred, the HARQ feedback for the respective PDSCH communications in a second slot.

13. The method of claim 12, wherein the first slot occurs before the second slot.

14. The method of claim 12, wherein the second slot occurs before the first slot.

15. The method of claim 12, wherein the UE is scheduled to transmit the HARQ feedback for the respective PDSCH communications is transmitted by a network node.

16. The method of claim 12, wherein the HARQ feedback for the respective PDSCH communications is transmitted based at least in part on a configuration stored by the UE.

17. The method of claim 10, further comprising:
determining the starting symbol for the HARQ feedback for the downlink SPS release based at least in part on the indication provided the downlink SPS activation.

18. The method of claim 10, further comprising:
receiving the downlink SPS activation,
wherein the first PDCCH communication and the one or more second PDCCH communications are received based at least in part on receiving the downlink SPS activation.

19. A non-transitory computer-readable medium storing a set of instructions for wireless communication, the set of instructions comprising:
one or more instructions that, when executed by one or more processors of a user equipment (UE), cause the UE to:
receive, in a same physical downlink control channel (PDCCH) monitoring occasion and in a same cell:
a first PDCCH communication that schedules a downlink semi-persistent scheduling (SPS) release, and
one or more second PDCCH communications that each schedule respective physical downlink shared channel (PDSCH) communications; determine that an error has occurred based at least in part on at least one of:
the UE being scheduled to transmit hybrid automatic repeat request (HARQ) feedback for the downlink SPS release and HARQ feedback for the respective PDSCH communications in a same slot, or
the first PDCCH communication and the one or more second PDCCH communications being received in the same PDCCH monitoring occasion, and
transmit, based at least in part on determining that the error has occurred, the HARQ feedback for the downlink SPS release in a first slot,
wherein a starting symbol for the HARQ feedback for the downlink SPS release is a particular symbol after a first symbol in the first slot and is based at least in part on an indication provided in a downlink SPS activation associated with the downlink SPS release.

20. The non-transitory computer-readable medium of claim 19, wherein the one or more instructions further cause the UE to:
refrain from transmitting the HARQ feedback for the downlink SPS release and the HARQ feedback for the respective PDSCH communications in the same slot based at least in part on determining that the error has occurred.

21. The non-transitory computer-readable medium of claim 19, wherein the one or more instructions further cause the UE to:
transmit, based at least in part on determining that the error has occurred, the HARQ feedback for the respective PDSCH communications in a second slot.

22. The non-transitory computer-readable medium of claim 21, wherein the first slot occurs before the second slot.

23. The non-transitory computer-readable medium of claim 21, wherein the second slot occurs before the first slot.

24. The non-transitory computer-readable medium of claim 21, wherein the UE is scheduled to transmit the HARQ feedback for the respective PDSCH communications by a network node.

25. The non-transitory computer-readable medium of claim 21, wherein the HARQ feedback for the respective PDSCH communications is transmitted based at least in part on a configuration stored by the UE.

26. An apparatus for wireless communication, comprising:
  means for receiving, in a same physical downlink control channel (PDCCH) monitoring occasion and in a same cell:
    a first PDCCH communication that schedules a downlink semi-persistent scheduling (SPS) release, and
    one or more second PDCCH communications that each schedule respective physical downlink shared channel (PDSCH) communications;
  means for determining that an error has occurred based at least in part on at least one of:
    the apparatus being scheduled to transmit hybrid automatic repeat request (HARQ) feedback for the downlink SPS release and HARQ feedback for the respective PDSCH communications in a same slot, or
    the first PDCCH communication and the one or more second PDCCH communications being received in the same PDCCH monitoring occasion; and
  means for transmitting, based at least in part on determining that the error has occurred, the HARQ feedback for the downlink SPS release in a first slot,
    wherein a starting symbol for the HARQ feedback for the downlink SPS release is a particular symbol after a first symbol in the first slot and is based at least in part on an indication provided in a downlink SPS activation associated with the downlink SPS release.

27. The apparatus of claim 26, further comprising:
  means for refraining from transmitting the HARQ feedback for the downlink SPS release and the HARQ feedback for the respective PDSCH communications in the same slot based at least in part on determining that the error has occurred.

28. The apparatus of claim 26, wherein the downlink SPS activation is associated with scheduling one or more different PDSCH communications.

29. The apparatus of claim 26, further comprising:
  means for transmitting the HARQ feedback for the respective PDSCH communications in a second slot based at least in part on determining that the error has occurred.

30. The apparatus of claim 29, wherein scheduled to transmit the HARQ feedback for the respective PDSCH communications is transmitted based at least in part on a configuration stored by the apparatus.

* * * * *